INVENTOR.
Albert T. Fellows
BY John A. Crowley Jr.
Attorney

INVENTOR.
Albert T. Fellows
BY John A. Crowley, Jr.
Attorney

United States Patent Office
3,228,848
Patented Jan. 11, 1966

3,228,848
METHOD AND CONTACT MATERIAL FOR CHEMICAL CONVERSION IN PRESENCE OF NUCLEAR FISSION FRAGMENTS
Albert T. Fellows, Levittown, Pa., assignor to Socony Mobil Oil Company, Inc., a corporation of New York
Filed Apr. 22, 1960, Ser. No. 24,123
19 Claims. (Cl. 176—39)

This invention is concerned with an improved method and contact material for utilizing energy from nuclear fission for the conduct of chemical reactions and transformations which can be made to progress only upon supply of substantial amounts of energy.

PRIOR ART

It is known that many chemical reactions may be caused to occur by subjection of the reactants, either in the presence or absence of porous or catalytic solid materials, to irradiation by alpha particles, neutrons, beta rays or electromagnetic gamma radiations emitted by radioactive materials and as a result of nuclear fission reactions.

United States Patent No. 2,905,607 discloses conversion of distillate hydrocarbons to isoparaffin-containing products in the presence of silica-alumina cracking catalysts under exposure to neutron radiation. United States Patent No. 2,905,606 discloses exposure of high boiling hydrocarbons in the presence of added hydrogen and a number of disclosed hydrogenation catalysts such as platinum on alumina to a neutron flux at a temperature in the range of 50 to 700° F. to effect both hydrogenation and conversion to lower boiling products. Other publications have disclosed conduct of a substantial number of various chemical reactions in the presence of various suitable catalysts and in the presence of gamma rays—United States Patent No. 2,905,608; in the presence of neutrons—British Patent No. 823,426, published November 11, 1959; and in the presence of radiation emitted by radioactive material—British Patent No. 785,611, published October 30, 1957.

It is known that the fission of fissionable materials, for example, uranium-235 ($U^{235}$), not only gives rise to energy in the form of certain forms of radiant energy and neutrons, but also to particles of large mass, possessed of energy in very considerable quantity. The energy in these particles of large mass is of the order of 80% of the total energy delivered by the fission of $U^{235}$. The possible utility of such energy may be exemplified, in a manner, by the following comparison. The energy necessary to break a hydrogen to carbon bond in methane is of the order of 4 electron volts. The energy, per fission, available in the total of the high mass fractions from the fission of a $U^{235}$ atom is of the order of 162 million electron volts.

It is known that these energies may be utilized for such purposes. Coekelbergs et al. ("Some Future Aspects of Radiochemistry", Belgische Chemische Industrie 22, No. 2, 153–64 (1957)) discuss both the utilization of the energy of radiant beta and gamma energy from wastes of the nuclear industry and also the utilization of the much greater recoil energy, which is communicated to fission fragments for the conduct of chemical reactions. A number of large G value exothermic and small G value endothermic radiochemical reactions are listed. These include oxidation of organic and inorganic compounds, for example, oxidation of benzene to phenol; polymerization and halogenation of hydrocarbons, for example, polymerization of ethylene; fixation of nitrogen; synthesis of ammonia; and rupture and transformation of organic and inorganic molecules, for example, transformation of methane to hydrogen and $C_2$ hydrocarbons, including acetylene, and transformation of acetylene to benzene and of water to hydrogen and oxygen.

Similarly, Harteck and Dondes have described experiments in which chemical reactants were placed in sealed vessels containing powdered, enriched $U^{235}$ and subjected in a nuclear reactor to thermal neutron flux of $10^{12}$ neutrons per square centimeter per second, whereby fission fragment ionization, as well as other usual ionizing radiations, was utilized to cause chemical conversion of gaseous reactants to different chemical products. The conversions of $CO_2$ to CO and $O_2$ and of $N_2$ and $O_2$ to $NO_2$ and NO were particularly studied. It was shown, for example, that fission energy could produce up to $10.2 \times 10^6$ moles of $NO_2$ per mole of $U^{235}$ at 175 to 225° C. ("Producing Chemicals With Reactor Radiations," Harteck and Dondes, Nucleonics, Volume 14, No. 7, 22–25, July 1956.) These workers have also effected conversion of methane to hydrogen and ethane and of liquid and gaseous ammonia to nitrogen, hydrogen and small amounts of hydrazine by subjecting, respectively, methane and ammonia sealed in silica vessels with one micron diameter glass fibers containing uranium oxide to a flux of neutrons at 10° C. and 10 atmospheres. In these experiments, part of the kinetic energy of the fission fragments which were emitted from the small diameter glass fibers was absorbed by the reactant phase and utilized for effecting the chemical conversion of the reactants present. ("Glass Fibers, a New Form for Reactor Fuels," Harteck and Dondes, Nucleonics, Volume 15, No. 8, 94 et seq., August 1957.)

In British Patent No. 770,594, published March 20, 1957, it is shown that a large number of chemical reactions may be initiated by causing fissionable atomic nuclei, which have been dispersed in solution or in very finely divided form throughout the reactants, to fission. Fissionable material is mixed with organic reactants in the liquid phase and caused to fission, whereby the effects of the fissioning nuclei are used to produce organic molecular fragments, which then combine to produce desired compounds. It is shown that a wide variety of organic reactions can be effected in this manner. One such type of reaction is the reaction of a simple compound with itself to produce a dimer of the molecular fragment formed from carbon-hydrogen bond rupture, for example, the conversion of methanol to ethylene glycol and formaldehyde, conversion of ethanol to mixed butanediols, conversion of acetic acid to succinic acid and of isobutane to iso-octane. Also, reactions between dissimilar organic compounds are described, for example, conversion of methanol and hexane to heptanols, conversion of heptane and acetic acid to mixed caprylic acids and conversion of heptane and acetonitrile to caprylonitrile.

Those of the above systems which involve utilization of kinetic energy from heavy fission fragments depend upon direct transfer of kinetic energy from the fission fragments to the fluid reactant. In these systems, the fissionable material is either dissolved in the reactant liquid or very small grains of fissionable material or of non-porous carrier material containing dispersed fissionable material are mixed with the reactants. On the other hand, Coekelbergs et al., in a paper entitled "Investigation of a Nuclear Fuel Making It Possible to Use the Kinetic Energy of Fission Products for Chemical Synthesis," presented at the Second International Conference on the Peaceful Uses of Atomic Energy and presented in Volume 29, pages 424–32 of the proceedings thereof, have incorporated naturally occurring uranium in finely divided, microporous solids and examined the reactions of $N_2O$ in the presence of such materials when subjected to the neutron flux obtainable in a nuclear reactor. Natural uranium oxide was dispersed in finely divided, large surface area, microporous alumina, active carbon and silica gel base supports, the exact shape and particle size of which are not specifically disclosed. It is shown that, due to the transfer of part of the fission fragment energy from the microporous solids to the fluid reactant phase, the velocity and amount of conversion of $N_2O$ to $N_2$, $O_2$ and $NO_2$ are greatly increased over the velocity and amount of conversion observed for a given radiation intensity in the absence of the microporous supports. In other words, the presence of the microporous material in which the fissionable material is dispersed greatly increases the G for the chemical conversion, where G expresses the number of molecules of fluid reactant product formed or reactant feed which disappears in the chemical reaction for a dissipation of 100 ev. of fission fragment energy. In effect, a substantial amount (up to about 20% in some cases) of fission fragment energy absorbed by the carrier is transferred therefrom to the fluid reactant phase where it may be, at least in part, utilized and transformed into chemical energy.

The contact materials disclosed in the last-mentioned reference are characterized by very low contents of $U^{235}$, being of the order of less than one-quarter of one percent by weight, and the fissionable material appears to be substantially uniformly dispersed throughout the contact material particle. Also, the systems disclosed in references hereinabove mentioned are such as to permit substantial quantities of heavy, solid fission fragments to escape from the carrier material and to enter the fluid reactant stream.

MECHANISM

The exact mechanism by which the porous contact material serves its very important function in connection with the chemo-nuclear reaction is not entirely known. However, without any intent that the invention be limited thereto, the following discussion of the probable function of the porous contact material may be helpful to the understanding of the preferred form of the present invention. Porous and preferably microporous materials of the type employed present a multitude of pores of small and controlled size distributed throughout a solid capable of retaining shape and volume under handling and operative stresses. Materials to be reacted or transformed, having access to the relatively enormous surface area per unit volume within the micropores, find an environment adapted for reaction or transformation, enhanced in the usual case by numerous active catalytic "sites" existing at or adjacent the walls of the pores. Fissionable material present in the solid bounding the pore walls will, upon fission, give rise to both radiant energy, neutrons and the particles of high mass and high energy spoken of previously. Bombardment of the pore wall material by the radiant energy of fission may, and in many cases will, create electronic anomalies giving rise to "sites" previously non-existent or altering the nature and effectiveness of "sites" already present. Ionizing radiation may cause temporary activation of solid surfaces by electronic excitation and thus bring the surfaces into sufficiently energetic state to cause chemical conversion of fluid reactants contacting such surfaces. Of possibly greater importance is the relatively enormous amount of kinetic energy present in fission fragments of high mass. Such fragments give up their energy by collision processes with the material of the pore walls. Resulting from these collision processes, there may be created both additional electronic anomalies in the material of the pore wall and a great build-up of energy in the material of the pore walls and in other materials which may be associated therewith or which may be found closely adjacent thereto, the total process giving rise both to catalytic "sites" and a supply of energy at relatively high level. This feature is particularly enhanced when the fissionable material is distributed in very fine grain size within the microporous inner portion of the contact material bodies or particles. Very elevated heating of very short duration is provided at a multitude of very small "sites" throughout the microporous inner portion of the particles and through a substantial part of the outer shell portion. This can result in permanent modifications of the structure of the pore walls. Fluid reactants which are in intimatic contact with the surfaces which are the seat of short duration, high energy concentrations and surface modifications are caused to undergo chemical conversion or transformation. Fission fragments which come to rest in the fluid reactant present within the pores of the contact material directly impart energy to the reactant at a time when it is in intimate contact or close proximity to active "sites" in the contact material. Carbon-carbon, carbonhydrogen or other chemical bonds are broken, resulting in production of molecular fragments of the fluid reactants, some of which may be free radicals. Such molecular fragments combine with similar or dissimilar fragments formed in the system so that chemical conversion to different fluid reaction products results.

As a result of the fission of an atom of fissionable material such as uranium, for example, some energy is released in the beta decay, radioactive gamma decay, fission neutrons, neutrinos and prompt fission gamma radiation. However, about 80% of the total energy released is in the form of kinetic energy of fragments of larger mass. There are a large number of these fragments varying in mass number from 72, an isotope of zinc, to 158, an isotope of europium. However, most of the fragments fall into a light group with mass numbers from about 85 to 104 and a heavy group with mass numbers from 130 to 149. Among the nuclides which have been noted in the fission products from $U^{235}$, for example, are xenon-135, cesium-137, strontium-89, barium-140, yttrium-91, cerium-141, zirconium-95, krypton-85, molybdenum-99 and iodine-131. For a given mass number, fragments have been observed with atomic numbers varying over a range of three or more, for example, tellurium-133, a solid at normal conditions, iodine-133, solid or vapor, depending upon temperature, and xenon-133, a gas at normal conditions, all have been observed among the fission products.

RELATED APPLICATIONS

Many of the fragments formed by the fission reaction are radioactive and some of the normally solid fragments formed have relatively long half lives. Escape of such materials from the carrier particles results in contamination of the fluid reaction products with radioactive material and complicates product recovery. For the above reasons, it is frequently important to prevent such escape and also in order to insure maximum utilization of the fission fragment kinetic energy for conducting the chemical conversion or transformation of fluid reactants present.

In my copending application Serial No. 24,124, filed in the United States Patent Office on April 22, 1960, there is claimed a method for utilizing the kinetic energy of heavy fission fragments for conduct of chemical conversions of fluid reactants, wherein the fluid reactants are brought into contact with a mass of porous, particle-form contact material containing dispersed fissionable material in sufficient concentration to render the mass capable, in the presence of suitably controlled and moderated neutron flux, of effecting a neutron-multiplying fission reaction. Chemical conversion of the fluid reactant is effected with concomitant transformation of part of the kinetic energy of the normally solid fission fragments to chemical energy. The contact material particles containing dispersed fissionable material are shaped and sized in such a manner as to prevent substantial initial escape from the particles of normally solid fission fragments.

In my copending application Serial No. 24,126, filed in the United States Patent Office on April 22, 1960, there is claimed a related method for conducting chemo-nuclear conversions in the presence of contact material particles or bodies containing fissionable material, wherein the particles containing dispersed fissionable material are encased in a porous, fissionable material-free shell layer which prevents initial escape of normally solid fission fragments from within the particles.

AREA OF PRESENT INVENTION

The present invention is concerned with a further improved, particle-form contact material and an improved method employing the same for utilization of fission energy for conduct of chemical conversions. The present method is applicable not only to systems in which the kinetic energy of normally solid fission fragments is transformed to chemical energy within the pores of microporous solids, but also to systems in which the energy transformation occurs in the fluid reactant stream outside of but adjacent the contact material particles, and to systems in which the fission energy is merely transformed to thermal energy and the latter is employed for the chemical conversion.

OBJECTS

A major object of this invention is the provision of an improved method for utilizing energy released by nuclear fission for conduct of chemical conversions and transformations in the presence of particle form solids containing fissionable material, which method provides improved economy of neutron utilization for promoting nuclear fission and minimum requirement of fissionable material.

Another object is the provision of an improved particle-form, solid material containing fissionable material, adapted for use in the above-mentioned method.

Another object is the provision of an improved method for utilizing the kinetic energy of normally solid fission fragments for conduct of high energy-requiring chemical conversions and transformations in the presence of contact materials containing fissionable material undergoing nuclear fission, which method permits improved efficiency of fragment energy transformation to chemical energy as opposed to heat energy.

Another object is the provision of certain improvements in contact material mass containing fissionable material and in the method for using the same in a process utilizing energy from nuclear fission for conduct of chemical conversions, which improvements permit incorporation of neutron-moderating material in the mass while, at the same time, permitting support of fissionable material in a carrier having properties tailored for the type of chemo-nuclear conversion involved.

Another object is the provision, in a process for utilizing the energy released by nuclear fission for conduct of high energy-requiring chemical conversions, of a contact material of substantial particle size, in which the fissionable material is concentrated in the contact material at sites where it can be most effectively used and from which contact material, when spent, unused fissionable material may be most economically recovered.

Another object is the provision of an improved method and contact material for utilization of kinetic energy of normally solid fission fragments for conduct of high energy-requiring chemical conversions and transformations in the presence of particle-form contact materials containing fissionable material, wherein a mass of such contact material may be employed under conditions providing a neutron-multiplying fission reaction with minimum requirement of fissionable material and wherein excessive contamination of chemical conversion products with normally solid fission fragments is avoided.

Still another object is the provision of a novel method and system for conducting and controlling self sustaining neutron-multiplying nuclear fission reactions in a bed of particle-form, fissionable material containing, solid material.

These and certain other objects of this invention will become readily apparent from the following description of the invention.

SUMMARY OF INVENTION

This invention involves a new and improved contact material particle for use in processes utilizing the energy of nuclear fission for the conduct of chemical conversions. In accordance with the broadest form of this invention, the particle of contact material is comprised of a core portion, which is substantially free of fissionable material and has a nominal diameter in excess of about 50 microns, and, surrounding the core portion, a fissionable material-containing portion having a thickness within the range of about 30 to 25,000 microns. The particle has an overall average diameter in the range of about 150 microns to about one inch.

In accordance with the preferred form of this invention, the core portion of the particle is composed of a material having good moderating properties or neutron-thermalizing properties. Its capture cross-section for thermal neutrons is below about 0.2 barn. Moreover, the fissionable material-containing portion is preferably microporous, having a surface area within the range of 5 to 1,500 square meters per gram. Fissionable material is dispersed in the microporous carrier material in less than about 6-micron grain size. Further, the particle is adapted to prevent substantial initial escape therefrom of normally solid fission fragments. This is accomplished either by proper shaping and sizing of the particle in the manner hereinafter discussed in greater detail or by encasing the fissionable material-containing portion of the particle in a fissionable material-free shell of porous, solid material, having a thickness within the range of about 10 to 100 microns.

Further in accordance with the preferred form of this invention, a mass made up of particles of the type above described is provided as a contact mass for conduct of chemo-nuclear conversions, and the relative volumes of the core portion and fissionable material-containing portions of the particles and the concentration of fissionable material in said particles are correlated to provide in excess of about 0.8% by weight of fissionable material in the overall particles and, of more importance, to render the mass capable of effecting a neutron-multiplying reaction when a suitably controlled and moderated neutron flux is maintained therein.

This invention also involves a method for utilizing energy of nuclear fission and preferably for utilizing the kinetic energy of normally solid fragments therefrom for conduct of chemical conversions of fluid reactants to products of different composition. Fluid reactant feed material is brought into contact with a mass of contact material particles of the type above described in a confined conversion zone. A neutron flux is maintained in said mass and suitably controlled to cause nuclear fission of the fissionable material in the particles, whereby energy is released and made available for the chemical conversion of the reactant feed to desired products. The resulting products from the chemical conversion are separated from the contact material mass and withdrawn from the conversion zone.

While, in its broadest aspects, the invention is not restricted thereto, in the preferred form, the method of this invention is conducted with a mass made up of particles adapted to prevent substantial initial escape of normally solid fission fragments therefrom, whereby maximum transformation of the fragment kinetic energy to chemical energy is assured and substantial contamination of chemical conversion products with such radioactive fragments is avoided. Also, it is preferred to employ particles which are composed of microporous material either in the fissionable material-containing layer or shell layer (if provided) or both. Moreover, while the invention is not restricted thereto in its broadest aspects, it is very much preferred to employ in the method of this invention a mass of contact material in which the concentration of fissionable material is sufficient to render such mass, in its environment in the conversion zone under conversion conditions, including the presence of suitable neutron moderation, capable of effecting a neutron-multiplying fission reaction in the presence of suitable neutron flux and preferably a self-sustaining, neutron-multiplying fission reaction. A neutron flux is maintained in the mass, and the neutrons are moderated so as to promote the neutron-multiplying fission reaction, with resultant release in high energy fission fragments, chemical conversion of the fluid reactant feed and concurrent transformation of some of the kinetic energy of the heavy fission fragments to chemical energy. Where the mass is subcritical, the neutron flux is provided from an outside source, and it may be controlled and moderated either within or outside of the mass and usually both, Where the mass is critical or above critical, self-generated neutrons are controlled and moderated in the mass. The neutron flux may be controlled by regulation of the amount of material in the conversion zone having high thermal neutron capture cross-section or by regulation of the amount of moderator and reflector material present or by any combination of these. The neutron flux is so controlled in the mass to promote or insure at least sufficient fission reaction to supply the energy required for the chemical conversion of the fluid reactant feed to the desired products. The contact material is maintained at a temperature level suitable for the chemical conversion and below a level which would cause serious heat damage to the contact material at least in part by removing from the contact material as thermal energy the excess fission energy which has not been transformed to chemical energy. The heat may be removed from the reactor either as sensible heat in the reactant stream or by means of suitable heat exchange media or a combination of both. The temperature in the contact mass may also be controlled in part by control of the neutron flux in the contact material mass.

In one form, operation in accordance with the method of this invention is made continuous by at least periodically with drawing used particle-form contact material from the reaction zone and replenishing the mass in the reaction zone with fresh contact material.

This invention also involves a novel method and system for conducting a nuclear fission reaction, wherein there is maintained in a confined zone a mass of particle-form, fissionable-material containing solids in which the total amount and concentration is insufficient to render said mass capable of effecting a neutron-multiplying fission reaction. The mass is rendered critical when desired by adjustably inserting thereinto of one or more members containing a substantial concentration of fissionable material while sufficient neutron moderating material is provided in the zone to thermalize the neutrons released by the fission reaction. When it is desired to stop the reaction the adjustable members are removed from the mass.

ADVANTAGES OF FISSIONABLE MATERIAL FREE CORE

In accordance with the broader aspects of this invention, the energy of nuclear fission may be utilized for conduct of chemical conversions in several different ways and the exact composition and characteristics of the fissionable material-containing contact material particles which are used to make up the mass may vary somewhat, depending upon the nature of the chemo-nuclear reaction involved. Advantages result from provision of fissionable material-free cores in the particles making up the mass in each of the several methods for utilizing fission energy for chemical conversion. Thus, where the energy released by fission is merely converted into thermal energy within the system and the thermal energy is used as such for the chemical conversion, the contact material particles are usually of relatively non-porous nature, although macro-porous particles may be employed. In this case, it is desirable to employ contact material particles of substantial size, as distinguished from powder, in order to reduce pressure drops due to reactant flow through the mass, and in order to prevent loss of fissionable material from the system or the accumulation of fissionable material-containing fines in uncontrolled parts of the system. The provision of the fissionable material-free core permits the desirable use of contact material particles of substantial size with concentration of fissionable material in the outer portion of the particle where the sites of heat release are closest to the reactant fluid. Also, this permits convenient incorporation of moderator within the core portion of the particles, with resultant decrease in overall space required for the moderator-fissionable material mass. Since the fissionable material is concentrated in the outer portion of the particles rather than being dispersed throughout the particle, its concentration can be higher in the portion of the particle where it is most needed than would otherwise be possible for the same total amount of fissionable material used. This results in an improvement in the efficiency of neutron utilization for promoting fission reactions and in an overall reduction in the total amount of fissionable material required for a given chemo-nuclear reactor. To the extent that the total amount of fissionable material in the system is reduced, risk of accidental accumulation of explosive or damaging concentrations of fissionable material is reduced. Moreover, in some cases, it is possible, when the contact material has become spent for use in the chemo-nuclear reactor, to effect a preliminary separation of the material forming the core from that carrying the fissionable material in the contact material particles so that only the latter material need be processed by differential solution stripping or otherwise to recover any unused fissionable material.

In operations where it is desired to permit fission fragments to escape the particles containing the fissionable material so as to bombard the molecules of reactant fluid passing through the mass, with some direct conversion of kinetic fragment energy to chemical energy, the contact material or carrier particles are usually non-porous or merely macro-porous. In this type of operation, all of the advantages mentioned above result from provision of a fissionable material-free core in the carrier particles. In addition, by concentration of the fissionable material near the surface of the particles, it is possible to insure escape from the solid particles of a much higher percentage of fission fragments than would be the case if the fissionable material were distributed throughout the particle. This enhances the proportion of fragment kinetic energy converted directly to chemical energy as opposed merely to thermal energy.

It is much preferred, for reasons mentioned hereinabove, to utilize the enormous supply of kinetic energy of the normally solid product fragments of nuclear fission for the conduct of chemical reactions by effecting the energy transfer at sites within the pores of porous, and preferably microporous, particle form contact materials which are activated by bombardment with the heavy fission fragments. The effectiveness of this type of process depends upon the capability of the fluid reactant reaching the active site by diffusion into the particle through its pores and of the heavy fission fragments themselves or their associated energy reaching the site by passage through the particle from the point of its release by fission. In the case of particles of substantial size, as opposed to powders, diffusion limitations frequently prevent the fluid reactant from reaching the inner core portion of the particles, at least in any substantial quantities. Likewise, in the case of particles of substantial size, the stoppage effect of the particle material on released fission fragments generally will cause the heavy, solid fragments to come to rest within about 10 to 50 microns of the point of release by fission, so that normally solid fragments or their associated energy released in the core portion of the particles may never reach the outer portions of the particle into which the reactant has diffused. As a result, the fissionable material in the core portion of the particle is wasted insofar as conversion of kinetic energy to chemical energy is concerned. In accordance with the present invention, the fissionable material which would be wasted in the particle cores is concentrated in those outer regions of the contact material particle where it can be effective for conduct of the intended chemo-nuclear reaction.

CONCENTRATION AND ENRICHMENT OF FISSIONABLE MATERIAL

In order to transmit to the fluid reactant phase as high a percentage of the fission fragment energy as possible during operation in accordance with the above-mentioned preferred form of the invention, it is necessary to disperse the fissionable material in grain size substantially smaller than the length of fission fragment path therein (i.e., grain size less than about 6 microns) and to maintain the ratio of the weight of fissionable material to weight of fluid reactant, i.e., ratio of stopping power of fissionable material to stopping power of fluid reactant, as low as possible. From a nuclear standpoint, diminution of the grain size and density of the fissionable material in this manner tends to increase neutron capture by the non-fissionable material present, leading to decrease in neutron economy, and also tends to decrease fuel life. This tendency may be counteracted by control of the concentration of fissionable material in the contact material. In the case of naturally occurring fissionable materials, such as $U^{235}$, this also involves suitable enrichment, e.g., enrichment of the $U^{235}$ content of naturally occurring uranium.

In order to provide a practical efficiency of neutron utilization for promoting nuclear fission and to provide a practical contact material life during operation in accordance with the preferred method of this invention, the lowest acceptable level of concentration of fissionable material corresponds to that minimum at which the amount of fissionable material in the aggregation or mass of contact material in the conversion zone as herein described and its distribution within the space occupied by such mass are just enough, under the environment conditions in the conversion zone during the chemical conversion process operation, including provision of suitable neutron moderation, to permit a neutron-multiplying fission reaction to persist so long as neutrons are introduced into the mass from an outside source such as a radium-beryllium neutron source. "Neutron-multiplying fission reaction," as employed herein in describing and claiming this invention, is intended to mean that the nuclear fission conditions in the mass are such that the effective ratio of neutrons existing in the daughter generation within the contact material mass to the number of neutrons existing in the parent generation is above about 0.95. This requires such neutron multiplication that even in the minimum case, when the mass is subcritical, the neutrons which flow into the contact mass from an external source are multiplied by at least a factor of twenty; but in the minimum case when the outside source of neutrons is removed, the neutron-multiplying reaction will stop. While it is contemplated that, in its broadest aspects, the method of this invention may also be employed using contact materials containing less than the above-indicated minimum, for reasons indicated, it is much preferred to provide fissionable material concentrations at least equal to the above-discussed minimum.

It is, of course, contemplated, in accordance with this invention, that the concentration of fissionable material provided in the contact material mass may be and usually will be above the minimum level above discussed; and, in one preferred form of the invention, the amount of fissionable material in the fissionable material-containing portion of the particles of contact material is sufficient to render the mass of said contact material in the conversion zone, in the environment therein, including suitable neutron moderation, capable of effecting a self-sustaining, neutron-multiplying fission reaction of critical or above critical level.

It will be realized that the concentration of fissionable material is not only one of weight percentage, but it is also a matter of the concentration of fissionable material in space; and, therefore, the physical size and shape of the contact material particles and the nature of their packing and percentage of interparticle voids enter into the determination of the concentration of fissionable material in an aggregation of particles. It is well known that the efficiency of neutron utilization for the fission reaction depends upon such factors as the physical geometry of the system and the nature and extent of neutron reflectors employed, both of which affect the amount of neutrons completely lost from the system. Other factors are the degree of enrichment of the material containing the fissionable material, for example, the amount relative to $U^{235}$ of $U^{238}$ which will capture neutrons without fission and the amount and nature of the moderator and other materials, such as the microporous support material and the reactor construction members, present in the mass or in the vicinity of the mass, which are capable of parasitic capture of neutrons. Usually graphite, water and heavy water are employed as moderators in atomic piles. In the present invention, it is advantageous, in most cases, but not necessary to incorporate the moderator material into the core portion of the contact material particles, although the reactant fluid, itself, may, serve to a major extent as moderator in some operations.

Further, with respect to the concentration of fissionable material provided in the contact material in actual operation in accordance with the preferred method of this invention, it is essential that the concentration of the fissionable material in the fissionable material-containing portion of the particles of contact material making up the contact material mass be sufficient to render said mass, in its environment in the conversion zone under conditions of conversion, including suitable neutron moderation, capable of effecting a neutron-multiplying fission reaction in the presence of suitable neutron flux. In one form (A) of the invention, the mass composition, geometry and arrangement in the conversion zone, its environment in said zone during periods of fluid reactant conversion, including the amount and arrangement in or closely adjacent said zone of materials having good neutron moderation and reflection characteristics and of materials having high capture cross-sections for thermal neutrons and the nature and amount of fissionable material in the contact material particles are altogether such that it is necessary to provide a suitably controlled neutron flux from an outside source in order to promote a neutron-multiplying fission reaction, such reaction persisting only so long as outside neutrons are supplied. In another form (B) of the invention, the mass composition, geometry and arrangement and the environment factors mentioned above and the concentration of fissionable material in the contact material are such that the mass is capable of and does effect a self-sustaining, neutron-multiplying, nuclear fission reaction. In this case, it is unnecessary to supply outside neutrons to provide the neutron flux, but the neutron flux in the mass may be controlled by moderators and control materials in a known manner similar to that used for atomic reactors. In still another form (C) of the invention, while the nature, composition and fissionable material content of the contact material are such as to render some aggregate or some aggregates of such contact material capable of effecting a self-sustaining, neutron-multiplying, nuclear fission reaction in the presence of a suitable neutron moderation, the geometry of the mass and its other environmental conditions in the chemical conversion zone are such that the neutron-multiplying reaction which occurs is subcritical and persists only so long as outside neutrons from some source such as a nuclear reactor are added to the mass. The term "neutron-multiplying fission reaction," as employed herein in describing and claiming this invention, is intended to generically cover all of the above forms (A–C).

It has been found that, if unenriched uranium is dispersed in the microporous contact material, even in relatively high concentration, it is not possible to provide a mass of such contact material which is capable of effecting "self-sustaining neutron-multiplying fission reaction" and it is unlikely that a mass could be provided which is capable of effecting a "neutron-multiplying fission reaction." Hence, when $U^{235}$ is employed as the fissionable material, it has been found essential to the proper conduct of the method of this invention to enrich the $U^{235}$ content of the uranium or uranium compound so that it is substantially greater than the $U^{235}$ content of naturally occurring uranium. The minimum required degree of enrichment will depend upon a number of factors, as will be apparent from the above discussion of required concentration. In general, as the density of uranium in the aggregate decreases, the required enrichment in fissionable isotope increases. By way of example, in the case of uranium, the required enrichment in $U^{235}$ may be within the range of 4 to 80% and more of the total uranium.

It will be apparent from the above that the concentration of fissionable material and its degree of enrichment as incorporated in the particle-form contact material which will be required to render the mass capable of a neutron-multiplying reaction or a self-sustaining, neutron-multiplying reaction in accordance with the method of this invention, will vary, depending upon the carrier or support material, the fluid reactants and the operating conditions involved, as well as upon the factors above mentioned and certain other factors which will be apparent to those acquainted with design of nuclear reactors and enrichment of fuel material therefor. The considerations involved in the methods employed in estimating the geometry for self-sustaining nuclear reactors are discussed in detail in many publications, such as Edlund and Glasstone, Elements of Nuclear Reactor Physics, Van Nostrand Co., 1952; Glasstone, Principles of Nuclear Reactor Engineering, Van Nostrand Co., 1955; Weinberg and Wigner, Physical Theory of Neutron Chain Reactions, University of Chicago Press, 1958; Bonilla, Nuclear Engineering, McGraw-Hill, 1957; Schultz, Control of Nuclear Reactions and Power Plants, McGraw-Hill, 1955. These publications also include consideration of the various factors influencing efficiency of neutron utilization for promoting nuclear fission and the manner in which these factors must be controlled to convert a subcritical but neutron-multiplying nuclear reactor system into a critical system. Similarly, methods for enrichment of uranium for use as reactor fuel are well known and are discussed, for example, in Cohen, Theory of Isotope Separation, McGraw-Hill, 1951; Glasstone, Sourcebook on Atomic Energy, Van Nostrand Co., 1950; Second Geneva Conference on Peaceful Uses of Atomic Energy, 1958, volume 4 of proceedings; Etherington, Nuclear Engineering Handbook, McGraw-Hill, 1958; Smyth, Utilization of Atomic Energy for Military Purposes, 1945, Princeton University Press.

"Fissionable material," as used herein in describing and claiming this invention, is intended to mean those materials which undergo nuclear fission as a result of absorption of thermal neutrons. Materials of this type which are presently known are uranium-235, uranium-233 and plutonium-239. The above fissionable materials may be used alone, in admixture with one another, or in admixture with other nuclides which can undergo nuclear reaction with the fissionable material.

*Retention of heavy fission fragments*

As indicated hereinabove, in accordance with the preferred form of this invention, in order to insure maximum transformation of the fission fragment kinetic energy into chemical conversion within the contact material pores and in order to prevent substantial contamination of the products of chemical conversion with radioactive, normally solid fission fragments, it is important to cause the fragments to come to rest within the contact material particles, rather than permitting them to escape from the exterior surface thereof. As is shown in my above-mentioned copending application Serial Number 24,124, this may be accomplished by controlling the shape and size of the particles making up the contact material mass so that the average weighted volume distance from within all portions of the particles containing fissionable material to the nearest external surface thereof (which distance is hereinafter referred to as Y) is greater than that expressed by the equation:

$$Y = \frac{10}{3}\left(\frac{500}{(1-P)d_s + P d_r}\right)^{1/2}$$

where Y is expressed in microns, P is the volumetric fraction of pores in the particle, exclusive of the core, $d_s$ is the true density of the solid material surrounding the core in grams per cc. and $d_r$ is the density in grams per cc. of the liquid or of the gaseous reactant material in the pores of the contact material under conversion conditions. It will be noted that $d_r$ may be the density of a liquid or gaseous material depending on the phase of the reactant in the pores. In the case of the particles provided by this invention which have fissionable material-free cores, only the outer portion of the particles which contain the fissionable material are considered in estimating the value of Y. For particles of essentially smooth surface and regular shape, i.e., spheres, cubes, polyhedrons, cones, cylinders, parallelepipeds, etc., the weighted volume distance from within all portions of the contact material particle to the nearest external surface is equal to the ratio of the overall volume of the particle less the volume of the fissionable material-fill core to its external smooth surface area expressed in consistent units. In the case of particles having smooth surface but irregular shape, the value of Y can be estimated by theoretically subdividing the particle into its various component shapes for the purpose of calculation or by use of other known methods for estimating the volume and external surface area of irregular shaped, smooth surfaced particles. In the case of particles having rough or irregular surface, whether of generally regular or irregular shape, i.e., particles having indentations and/or protrusions on the external surface of dimensions less than 50 to 100 microns, the value of Y may be conveniently estimated by treating the particle as a smooth surface particle of the same shape, the surface of which is dimensioned so as to volumetrically average the protrusions and indentations. For example, in the case of a particle of generally spherical shape, having its external surface broken by a plurality of small, hemispherical indentations which decrease the particle volume by a given amount (V') and a plurality of hemispherical protrusions which add to the sphere volume by a given amount (V"), the volume over surface area ratio can be calculated on the basis of a smooth surface sphere sized to have the same actual volume as the one with the protrusions and indentations (the volume of the latter being calculated by taking due account of the protrusions and indentations). By similar methods the volume of the core which is to be subtracted from the volume of the entire particle in determining Y can be estimated. Usually for microporous materials of the type employed in the method of this invention, the values of $d_s$ range from about 1.8 to 4.0 and the pore volumes from about .30–.70 although in some cases the values may fall outside these ranges. The value of Y for such microporous materials will fall within the range about 25 to 130 microns and usually within the range 50 to 100 microns when the pores of the contact material particles are filled with reactant in the gaseous phase. The values of Y will be generally about 4 to 20 microns lower than those above indicated when the pores are filled with reactant in the liquid phase depending upon pore volume of the particles and density of the liquid. It is of interest to note that in the case of spherical particles with spherical cores, the external particle diameter minus the cube of the diameter of the core divided by the square of the whole particle diameter will be six times the Y value, which Y value must be greater than the minimum allowable Y value given by the preceding equation. And for particles approximating cubical shape, with cubical shaped cores, the length of the external cube side minus the third power of the core side divided by the second power of the external particle side will be six times the Y value. This does not mean, however that it is sufficient in order to insure initial retention of substantially all of the heavy fission fragments in the particle to provide particles having lateral dimensions as determined by usual screen analysis six times greater than the sum of six times the above specified Y value plus the ratio of the third power of the core dimension to the second power of the external particle dimension or above some other specified value. A particle in the shape of a rectangular parallelepiped having side dimensions of one inch by one inch by 25 microns, for example, would not pass through a screen having an opening only slightly less than one inch; yet, a very substantial fraction of the heavy fission fragments would escape from such a particle. On the other hand, particles shaped and sized in the manner above described will initially retain (i.e., bring to a stop within the particles) substantially all of the heavy fission fragments released by fission of said fissionable material. It will be understood that the term "substantially all of the normally solid fission fragments," as used herein in describing and claiming this invention with relevance to fragments initially retained in the contact material particles, is intended to mean about 90 to 100% of the total, normally solid fission fragments.

Initial retention of normally solid fission fragments within the contact material particles may be even more effectively accomplished by the method covered in my above-mentioned copending application Serial Number 24,126, i.e., by encasing the portion of the particle containing fissionable material with a jacket or shell of porous, solid material of sufficient thickness to prevent passage therethrough to the exterior surface thereof of the normally solid fission fragments. The minimum shell thickness required to initially retain substantially all of the normally solid fission fragments will depend upon the overall size and shape of the contact material particles and the composition, porosity and density of the shell material. In general, for porous shell materials of the type contemplated herein, the shell thickness should fall within the range of about 10 to 100 microns and preferably about 20 to 50 microns. For spherical or generally cubical shaped particles of relatively large size, i.e., diameter of about 600 microns or more, a shell thickness of only about 10 microns will accomplish initial retention of substantially all of the solid fission fragments. For these particles, shell thickness of 20 microns will insure initial retention of essentially all the normally solid fission fragments. For smaller particle sizes and for particles having small cross-sectional dimensions in one or more directions, the shell thickness should be at least 20 to 30 microns.

Fission fragments which are normally gaseous under the conditions of temperature and pressure maintained in the contact material, for example, nuclides of xenon, krypton and, in some cases, iodine and bromine, after transfer of their kinetic energy to the contact material or reactant fluid within the contact material pores, may eventually escape from the contact material by diffusion through the pore passages. When the reactant is gaseous, substantially all of the normally solid fission fragments which are initially retained within the particles will be permanently retained. When the chemical reactant in the pores is in the liquid phase, there is some tendency for the liquid to carry out through the pores normally solid fission fragments which initially come to rest in such liquid. On the other hand, there is also a tendency for the solid fragments to be filtered out of the liquid and left behind on the pore walls, or to be filtered out of the liquid by the porous material of the bed which acts as an adsorbent filter. A low energy solid fragment which may have escaped from one particle is usually adsorbed onto another in the bed which acts as a filter bed. Hence, most of the normally solid fragments which are initially retained will be permanently retained in or on the particles of the bed. The gaseous fission fragments are initially radioactive but decay by beta and gamma emission largely to stable nuclides in a relatively short time. On the other hand, the half lives of the radioactive, normally solid fission fragments are, in general, much longer and, depending on the nuclide, the time required for decay to stable nuclides may be a matter of months or years. Thus, by provision of the contact material particles in a form adapted to entrap the normally solid, radioactive fragments which might otherwise escape from the surface of the particles and enter the fluid reactant stream, and by separation of fluid chemical reaction products from the contact material and separate withdrawal thereof from the conversion zone, the problem of cooling off and decontamination of the fluid chemical reaction products is greatly simplified.

CONTACT MATERIAL—GENERAL

In accordance with this invention, the contact mass material employed in the chemo-nuclear reactor is made up of solid particles having nominal diameters within the size range of about 150 microns to about one inch, preferably 600 microns to one-half inch and usually one-tenth to one-quarter inch. The term "nominal diameter", as employed herein in describing and claiming this invention, refers to a diameter determined on the basis of particle density and weight measurements from the equation $$D_n = \sqrt[3]{\frac{6}{\pi d_p N}}$$

where $D_n$ is the nominal diameter of the particle in centimeters, $d_p$ is the density of the particle in grams per cubic centimeter and N is the number of particles per gram. The particles may take any of a number of shapes such as spheres, extruded or formed cylinders, pills, tablets, pellets, cubes or even particles of irregular shape. Spherical particles are particularly preferred because of their strength and regularity of shape. It will be understood that the term "particle-form", as used herein in describing and claiming this invention, is employed in a sense sufficiently broad to include particles of any or all of the above-mentioned shapes. It is preferred to employ particles in which the maximum transverse dimension is not more than 5 times the minimum transverse dimension.

The mass of particle-form contact material may be maintained in the conversion zone in the form of a bed or column which may be fluidized but which is preferably substantially compact. For liquid phase operation, the columnar mass may be maintained in partially expanded condition in order to permit higher rates of liquid throughput.

PARTICLE CORE

The core portion of the contact material particles should have a nominal diameter in excess of about 50 microns and preferably in excess of about 100 microns. The maximum core size will depend on the nature and thickness of the fission layer, whether the particle is jacketed and the degree of fission fragment retention desired. In general, the core portion should occupy about 20 to 90% of the total particle volume. The core portion should be substantially free of fissionable material and should have a thermal neutron capture cross-section at least below about 10 barns and preferably below about 0.5 barn. Preferably, the core should be composed of or contain amounts of a good neutron moderator material such as carbon, beryllium, beryllium oxide, hydrogen, deuterium, water, heavy water or hydrocarbons. In general the moderator materials should have capture cross-sections for thermal neutrons below about 0.2 barn and preferably below about 100 millibarns. The terms "good moderator material" or "effective moderator material" as used herein in describing and claiming this invention are intended to include the materials specifically mentioned above and such other materials which have equivalent properties for thermalizing neutrons. The core portion is usually a porous or non-porous, solid material, although, in some cases, the core may consist of a suitable casing, such as a zirconium or aluminum casing, confining a void space, which may, in some cases, be filled with suitable liquid or gaseous material.

Usually, the core portion is composed of non-porous or catalytically inactive, porous, inorganic materials, since the fluid reactant for the most part fails to penetrate the contact material particles into the core portion thereof. Exemplary of non-porous materials which may be employed for the core portion are metals such as zirconium, nickel, iron, beryllium, copper, cobalt, magnesium, aluminum and the oxides thereof, which, in some cases, are porous; titanium oxide or nitride; the carbides or nitrides of iron and beryllium and magnesium; silica; fused quartz, silicon, silicon carbide, glass fibers, impervious porcelain, periclase, mullite and Carborundum. In some cases, the more dense materials listed may be mixed with less dense materials, preferably those having good moderator properties.

If desired, any of the porous or microporous carrier materials mentioned hereinafter in connection with the fissionable material-containing portion of the particles may also be employed for the core portion.

FISSIONABLE MATERIAL-CONTAINING LAYER

The fissionable material portion of the contact material particles encases the core portion, and its thickness will depend somewhat upon the method by which the fission energy is utilized for the chemical conversion, upon the desired fission fragment retention characteristics of the particle, the presence or absence of an encasing porous jacket and upon the diffusion characteristics of the system involved and the amount of fissionable material incorporated. In general, the fissionable material-containing layer may range from about 30 to 25,000 microns and preferably 200 to 10,000 microns in thickness. Usually, the thickness will be in the range of about 550 to 8,000 microns. When it is desired to permit substantial amounts of fission fragments to escape from the particle, the fissionable material layer should be so dimensioned as to permit concentration of the fissionable material dispersed therein within about 200 microns and preferable 100 microns or less of the exterior surface of the particle. Similarly, when a porous fissionable material free jacket is provided around the fissionable material-containing layer, it is desirable to permit a high percentage of the normally solid fission fragments to enter the porous shell portion so as to release kinetic energy there in the presence of fluid reactants. Hence, in this case, it is also desirable to concentrate the fissionable material within a region of the fissionable material-containing layer which is within about 200 microns and preferably 100 microns or less of the shell interface. On the other hand, when it is desired to prevent substantial escape of fission fragments from the particle, then, in the absence of a fissionable material-free jacket, the fissionable material layer should be shaped and sized in the manner hereinabove discussed so that the value Y is above that expressed by the above mentioned formula:

$$y = \frac{10}{3} \left( \frac{500}{(1-P)d_s + Pd_r} \right)^{1/2}$$

In accordance with the preferred forms of this invention, the concentration of fissionable material in the fissionable material-containing portion of the particles making up the contact material mass in the conversion zone and the relative volumes of this latter portion and of the core portion should be correlated so that the amount of fissionable material in the particles is sufficient to render the mass, in its environment in said zone under the chemical conversion conditions, including suitable neutron moderation, and in the presence of suitable neutron flux, capable of effecting a neutron-multiplying reaction and preferably a self-sustaining, neutron-multiplying reaction. This requires a concentration of fissionable material amounting to substantially in excess of about 0.8% by weight of the total particle.

In accordance with the broader aspects of this invention, the fissionable material-containing layer may consist of fissionable material, itself, in the form of a metal or suitable compound thereof, such as an oxide or a carbide. However, it is preferred to disperse the fissionable material in a suitable inorganic carrier material which is relatively stable and does not disintegrate as a result of nuclear fission occurring therein and which is capable of retaining its form and strength under the conditions of its use. In general, the carrier material should have a relatively low thermal neutron capture cross-section, below about 10 barns and preferably below 0.5 barn. The carrier material may, in some cases, be non-porous, in which event it may be composed of any of the non-porous materials mentioned above as suitable for non-porous core portions. On the hand, in accordance with the preferred form of the invention, in order to attain maximum transformation of the fission fragment energy to chemical energy, the carrier material for the fissionable material-containing portion of the particles is porous. The surface area of such porous carrier material should be broadly within the range of 5 to 1,500 square meters per gram and preferably within the range of 50 to 700 square meters per gram. The pore volume should be within the range of 5 to 70% and preferably 30 to 50%. The pore radii may range from about 4 angstroms to 100 microns. Microporous carrier materials are preferred. The term "microporous," as employed herein in describing and claiming this invention, is intended to mean porous, solid materials having at least 5% of their volume devoted to pores and at least 25% of the total pore volume devoted to pores having radii less than 100 angstroms. Particles in which a major portion of the pore volume is made up of pores having radii from about 4 to 100 angstroms are particularly well adapted for use in the method of this invention. The carrier material may range in bulk density from about 0.4 to 3.0 and in particle density from about 0.8 to 6, depending upon the material. Measurement of pore size and pore size distribution in various porous materials are discussed by L. C. Drake and H. L. Ritter in Industrial and Engineering Chemistry, Analytical Edition, Volume 17, pages 782 to 791 (1945). Methods described there may be employed in determining bulk density, average pore diameter and other pore measurements referred to herein. The term "surface area," as used herein, designates the surface area of the porous contact material as determined by the adsorption of nitrogen according to the method of Brunnauer et al., Journal of the American Chemical Society, Volume 60, pages 309 et seq. (1938).

It has been noted that some porous materials may be more beneficial than others when used for effecting specific chemical reactions in accordance with the preferred method of this invention and that the effectiveness of a particular porous material may depend on operating conditions. In general, the material selected for any given application should have pores in at least the shell portion, when provided, and preferably also in the fissionable material containing portion of the particles sized to permit ingress and egress of the fluid reactant involved. In general, it is expected that porous materials which are well adapted as catalysts for chemical conversion of given fluid reactants in the absence of fission fragments will also be well adapted for use in the preferred method of this invention as applied to the conversion of the same reactants, and the advantages of this invention may be expected to result. Exemplary of porous and microporous materials suitable for use as the carrier material in the fissionable material-containing portion of the particles are siliceous earths such as diatomaceous earth, infusorial earth and kieselguhr; natural clays and clay-like materials such as kaolin and montmorillonite clays, bentonite, fuller's earth, Superfiltrol, bauxite and Porocel; porous ceramic materials such as unglazed porcelain; natural or artificial zeolites; molecular sieves such as naturally occurring chabazite, selective synthetic zeolite or aluminum silicate selective adsorbents, for example, calcium aluminum silicate; chamotte; asbestos; pumice; talc; activated carbon, bone char, charcoal or graphite; hydrosilicates, particularly those of aluminum; synthetic inorganic materials such as activated alumina, magnesium oxide and gels of silica, alumina or silica and alumina or similar gels containing zirconia, chromia or molybdena. The surface area and porosity characteristics of such core materials may be, to some extent, regulated by the method of their preparation or treatment. In general, the core material is an "inorganic material," this term being employed herein in describing and claiming the invention in a sense sufficiently broad to cover activated carbon, graphite, charcoal and bone chars which are essentially carbon, even though, in some cases, such carbons may contain small amounts of hydrogen.

PARTICLE JACKET

When a jacket or shell portion is provided around the fissionable material-containing portion of the contact material particles in order to insure initial retention of normally sold fission fragments within the particles, it should be porous in order to permit escape of gaseous products formed from the nuclear fission reaction and in accordance with the preferred forms of this invention in order to permit ingress and egress of the fluid chemical reactants. In general, the shell material should have a surface area within the range of 5 to 1,500 square meters per gram and preferably 50 to 700 square meters per gram. The pore volume of the shell material should fall within the range of 5 to 70% and preferably 30 to 50% of the total shell material volume. The radii of the pores should generally fall within the range of about 4 angstroms to 100 microns. Preferably, the shell material should be microporous. When the fissionable material-containing portion of the particle is porous, at least 50% of the pores in the shell portion should have radii greater than 100 angstroms in order to insure rapid diffusion of fluid reactants to and from the porous inner portion of the body. On the other hand, when the inner portion is non-porous, at least 50% of the pores in the shell portion should preferably be devoted to pores having radii less than about 100 angstroms.

The shell material may take the form of any of a large number of compositions, generally inorganic, depending to some extent on the composition and nature of the inner fissionable material-bearing portion, upon the chemical conversion to be effected and conditions and catalyst characteristics required for such conversion. In general, the shell material should be hard and abrasion-resistant so as to prevent easy breakage, crushing and dusting, and the shell material should be non-corrosive and chemically inert to the reactant fluid. It should have a thermal neutron capture cross-section below about 10 barns and preferably below about 0.5 barn. In order to prevent cracking due to temperature changes, the shell material should preferably have a coefficient of expansion close to that of the material employed for the fissionable material-containing portion of the particles. In general, materials of the type indicated above to be useful as porous or microporous carrier materials for the fissionable material-containing portion of the particles may also be employed as shell material. Other porous or spongy materials which may be employed are oxides of such metals as calcium, barium, nickel and iron in addition to aluminum already mentioned, which are formed by thermal decomposition of carbonates, hydroxides or nitrates of these metals which have been deposited on the exterior surface of the inner fissionable material-containing portion of the particle. When the inner portion is metallic, the shell portion may take the form of a spongy layer of a suitable metal, such as iron, copper and nickel.

Catalytic constituents

The shell portion and the fissionable material-containing and core portions of the particles, when porous, may be either one or both impregnated with certain metals or compounds thereof added because of their beneficial catalytic influence on the chemical reaction involved. Exemplary of such catalysts and supports therefor and reactions for which they are useful are: mixtures of silica with alumina, zirconia or magnesia for the catalytic cracking of hydrocarbons; chromia or molybdena on alumina or cogelled chromia-alumina or molybdena-alumina catalysts for hydrogenation or for dehydrogenation and reforming of hydrocarbons, particularly those in the gasoline boiling range; platinum or nickel on alumina containing small amounts of halogens or on silica gel for isomerization of hydrocarbons; chromia on alumina or on silica-alumina gels for dealkylation of alkyl aromatic hydrocarbons; mixtures of alumina, tungstic acid and ferric oxide (or zinc oxide) for various dehydration or hydration reactions, that is conversion of alcohols such as ethyl alcohol to olefins or the reverse depending upon the specific catalyst and reaction conditions, the oxide mixture may be employed as catalytic material or it may be mixed with suitable inert porous carrier material in order to increase the porosity of the overall contact material; a mixture of the oxides of copper and tungsten on charcoal for the hydration of ethylene; mixtures of iron oxide with chromia and potassium oxide on suitable carrier such as microporous alumina for dehydrogenation of ethyl benzene to styrene; mixtures of iron oxides promoted with alumina and potassium oxide, usually partially reduced by low temperature gaseous reduction, for the Fischer-Tropsch or ammonia synthesis, the carrier material in this case may be silica gel, or kieselghur, for example; vanadium oxide on asbestos for oxidations such as that of naphthalene to phthalic anhydride, or of sulfur dioxide to trioxide; sulfides of tungsten, molybdenum and of iron group metals (iron, cobalt, nickel) on suitable support such as alumina for the hydrogenation of coal-tar, heavy oil or sulfur containing material in general; nickel on alumina or silica for conversion of hydrogen and carbon monoxide to $C_1$–$C_4$ gaseous paraffins; mixtures of copper with ammonia with or without added porous inert carrier such as pumice or kieselghur for hydrogenation of carbonyl and carboxyl containing compounds to alcohols, mixtures of copper and zinc on silica or alumina for the dehydrogenation of alcohols; silver on pumice for dehydrogenation of alcohols, such as the conversion of methanol to formaldehyde and palladium on bone-char for reduction of ketones. When the catalytically active metal or metal compound constituent of the carrier has a relatively high neutron capture cross-section, its concentration in the carrier is restricted to a level, usually below one percent, at which it will not seriously interfere with the neutron efficiency of the system. It will be understood that the above-mentioned catalytic materials may be employed as the fissionable material-containing layer surrounding the particle core or in the particle shell layer (when provided). In the former case fissionable material is also added to the support or carrier material.

*Contact material preparation*

Contact material for use in the method of this invention may be manufactured by any of several alternative methods, depending upon the particular characteristics desired. Thus, when it is desired to provide porous contact material particles having the same composition throughout, the particles may be composed of one of the natural porous materials mentioned hereinabove or alternatively preformed, synthetic porous materials. When a natural material is employed, it may be necessary to treat such material to improve the physical properties thereof and to remove therefrom materials the presence of which is undesirable from the standpoint of chemical reaction. It may also be necessary in some cases to treat the carrier material with acids or other suitable chemicals to effect removal therefrom of elements having high neutron capture cross-sections such as lithium, cadmium, samarium, gadolinium, boron, cobalt and europium or other undesirable materials such as compounds of nitrogen and sulfur. After suitable treatment, the natural material may be ground to powdered form, mixed with a suitable binder, molded to desired particle form, dried and calcined. Synthetic carrier materials may be prepared by precipitation in the form of hydroxide or carbonate, etc., followed by drying and calcining. Also, more complex carrier materials may be prepared by coprecipitation of two or more compounds, for example, hydroxides of silicon and aluminum or of chromium or molybdenum and aluminum, etc., followed by washing, curing, drying and calcining, and suitable molding or pelleting of the powdery material to desired particle form. In either case, the formed porous particles may be impregnated, if desired, with one or more catalytically active metal compounds by soaking with an aqueous solution of a water-soluble, thermally decomposable salt thereof or a solution of a non-water soluble salt in a solvent which can be removed subsequently from the solid. The same procedure may be followed with preformed, porous, synthetic particles. Thus, for example, a porous alumina can be impregnated with a solution of nickel nitrate, which can be thereafter decomposed by drying and heating the impregnated alumina in air. Finally, the alumina may be heated in a reducing atmosphere to reduce the nickel oxide to nickel, thereby providing a porous contact material suitable for use in hydrogenation of organic compounds, particularly hydrocarbons. Alternatively, the catalytically active compound may be mixed in powder or solution form with the powdered, porous carrier material prior to molding into particles. In some cases, the compound added to the porous carrier may have catalytic properties in the form added as, for example, aluminum chloride on bauxite or alumina as an isomerization or alkylation catalyst.

Microporous base or carrier material for the contact material particles may be prepared by formation of suitable colloidal solutions containing hydrous oxides of suitable metals and of silicon, followed by cogelling in a non-aqueous medium to form spherical hydrogel particles. Such particles may be washed free of impurities, cured under specified conditions and calcined to a final form, which is a hard, attrition-resistant spheroid which may have a diameter of the order of one-eighth inch, for example. Such hydrogels as those of silica-alumina, silica-stannic oxide, silica-zirconia, silica-alumina-zirconia, etc. may be formed. Such a method is disclosed by Marisic in United States Patent No. 2,384,946. Other materials, such as chromia and platinum, may be incorporated in such bead materials for special purposes. Also, the internal structure, as well as the overall hardness, of such beads may be modified with particular increase in attrition resistance by the incorporation of certain amounts of fines of the same general composition as the final bead in the material to be cogelled. Also, if desired, substantial amounts of powdered moderator material having effective thermal neutron capture cross-sections below about 100 millibarns, such as beryllia or graphite, may be incorporated in the beads.

The fissionable material may be incorporated into the particle in any of a number of ways. For example, preparatory to molding, the porous carrier material may be mixed with a combustible binder, such as hydrogenated corn oil. The formed particles may then be heated in air at temperatures within the range of 400 to 1,100° F. for about 2 to 15 minutes to effect removal of only a portion of the binder by combustion. The binder is selectively burned from the outer 10 to 80% volume portion of the particles, leaving the pores of the core portion blocked with binder. The outer layer of the particles then may be impregnated with an aqueous or solvent solution of the fissionable material. The impregnated particles may then be dried and heated in air at elevated temperature to effect combustion of the unremoved portion of the binder and to convert decomposable metal salts of fissionable materials and of any added catalytically active components to oxides.

As an example of the particle impregnation with fissionable material, porous bauxite or synthetic silica particles prepared in the above manner may be impregnated with solutions of uranyl nitrate or with molten uranyl nitrate herahydrate and then heated in a nitrogen stream to decompose the nitrate to the oxide. Prior to further impregnation steps, it is desirable to continue the heating in a hydrogen stream at 800–950° F. until the dew point of the hydrogen is 30° F. in order to reduce the uranium oxide to the dioxide which is less soluble in usual impregnating solutions. Uniformity of dispersion in the layer surrounding the core portion of the particles may be aided by slowly heating the impregnated particles in molten uranyl nitrate hexahydrate under elevated nitrogen or hydrogen pressure with bleed-off of $NO_2$ formed so as to maintain pressure of the order of 100 p.s.i.g. Alternatively, the porous carrier particles which contain binder in the core portion thereof may be impregnated with uranyl acetate solution. One method for improving uniformity of distribution of fissionable material in the porous matrix material, which has been described in the literature, involves impregnation of the porous carrier with a solution of uranyl nitrate dihydrate in tertiary butyl alcohol, quick freezing of the impregnated material in liquid nitrogen, sublimation of the solvent below the melting point of the solution by a "freeze-dry" process, followed by heating to 1,340° F. The impregnation may be accomplished by exposing porous or microporous carrier material to an appropriate gas or vapor form compound of the fissionable material, for example, by use of the volatile uranium halides especially $UF_6$ and the clhorides. Upon treatment with water and heating in situ these halides are converted to oxides of uranium.

In another method, a procedure somewhat analogous to that shown by Weisz in United States Patent No. 2,856,367 may be employed for impregnating the particles with fissionable material. For example, the preformed, porous carrier particles may be brought into contact with molten wax until the wax has penetrated within the pores of the solid to an extent substantially greater than that desired for the enveloping fissionable material-containing layer. Then, after removal from contact with the wax, and allowing the wax to solidify, the particles are treated with a suitable wax solvent for a sufficient time to remove any superficial wax and also to remove wax from the pores to a depth corresponding to that desired for the fissionable material-containing layer. After removal of the wax solvent and dissolved wax, the particles are then impregnated with a suitable solution of the desired fissionable material. The particles are then dried and treated with a solvent which selectively dissolves the wax in the core portion but not the fissionable material. Thereafter, the particles are again dried and calcined to provide particles having a porous core substantially free of fissionable material surrounded by a fissionable material-containing layer. If desired, after impregnation with fissionable material, the particles may be again brought in contact with wax so that wax again penetrates the pores. The particles are then again treated with wax solvent to remove wax from an outer portion of the particles corresponding to the desired protective shell portion. Thereafter, the particles are treated with a leaching agent, such as, for example, dilute nitric acid, capable of leaching out the fissionable material in the shell portion not protected by the wax. After removal of the remaining wax by means of selective wax solvent, the particles are washed, dried and calcined to provide particles having a porous core portion and a porous outer shell portion, both of which are substantially free of fissionable material and having an intermediate portion which contains finely dispersed fissionable material.

Somewhat different procedures may be employed for preparation of particles having core portions which differ in composition from the remaining portion or portions. For example, the fissionable material may be mixed with carrier material, binder and, if desired, decomposable compounds of catalytically active material in the form of a paste, which is then cast or molded around porous or non-porous core particles of somewhat different composition. Alternatively, the porous or non-porous core particles may be coated in one or more stages with solutions from which hydrogels, gelatinous precipitates or precipitates form. Such coatings should be in the form of thermally decomposable compounds of silicon, aluminum, beryllium or other suitable metals, such as the hydroxides, carbonates or nitrates thereof. For example, particles of silica gel may be soaked in an aluminum nitrate solution, after which ammonium hydroxide solution is added to precipitate alumina gel. The particles are then washed and dried for about 10 to 18 hours at 250° F. The procedure may be repeated until the desired layer thickness has been provided. The particles of this example are finally calcined to provide particles having a silica core and a porous alumina outer layer. Similarly, core particles composed of alumina or other suitable material may be dipped or soaked in ethyl orthosilicate until the particles are saturated. They may then be drained, dried at 220° F., and the procedure may be repeated to provide the desired layer thickness. The added layer is impregnated with a suitable, decomposable compound of fissionable material, dried and calcined at 1,000 to 1,200° F. The resulting particles are comprised of an alumina core surrounded by a fissionable material-containing layer of silica. An analogous method for addition of silica layers is disclosed in United States Patent Number 2,580,429 and Patent Number 2,580,806. The method may be extended to non-porous core particles by dipping the non-porous particles in a heterogeneous solution of alumina powder in aluminum nitrate, followed by air drying and subsequent oven drying and calcination. After a suitable porous alumina surface has been applied to the non-porous core particle, for example, porcelain, free of fissionable material, the particles may be treated for application of a silica shell in the manner above described. The resulting porous layer may be impregnated, if desired, with compounds which may be converted to suitable metals or metal oxides, such as platinum, copper oxide or chromia, as well as with a decomposable compound of the fissionable material. If desired, fissionable material-free shell layers may be coated onto the fissionable material-containing particles by the procedures discussed in this paragraph.

It will be understood that the core portion may be composed of a mixture of materials, for example, beryllia-alumina, beryllia-silica, silica-alumina, alumina-carbon, silica-carbon or beryllia-alumina-carbon. When the core material is porous it is desirable to deposit carbon in the cores and heat at high temperature in the absence of air to harden the carbon and the overall core particle. It is contemplated that in some forms of the invention the fissionable material containing layer may also take the form of porous ceramic support material having the pores thereof filled with carbon or graphite.

Another method for preparing the contact material particles of this invention involves a procedure somewhat analogous to that shown by Marisic, United States Patent Number 2,384,944. In applying this procedure, the preformed particles of core material are formed into a slurry with a suitable liquid. This slurry is then introduced through the central passage of a compound nozzle, with a composition of hydrosols capable of setting to a hydrogel coming through an annular passage to surround the slurry, the whole being passed into a gel-forming and gel-setting area, followed by suitable finishing of the composite articles to give particles comprising a suitable core portion surrounded by a microporous layer. The latter layer may be impregnated with fissionable material by methods above discussed. Alternatively, where the core particles are non-porous, a soluble salt of the fissionable material, for example, uranyl nitrate, may be present in the alum ingredient of the reaction mix destined for gel formation.

When the core portion is composed of reduced metal such as zirconium, beryllium, aluminum, iron, nickel or copper, a spongy metal layer suitable for supporting metallic, fissionable material may be formed on the inner core by resort to powder metallurgy technics or by condensation of metal vapors or by coating with metallic compounds convertible to oxides which are then reduced. Protective shell layers may be similarly added to the fissionable material-containing layer. Alternatively, the fissionable material-containing layer may be composed principally of the fissionable material or a compound thereof. Such layer may be deposited on the core portion of the particle by bonding the fissionable material thereto by methods based on chemical interaction of the fissionable material, for example, an oxide, to lead to a bonded lower oxide, metal or carbide of uranium. In those applications of the invention in which a non-porous, fissionable material layer is satisfactory, this layer may be treated to harden its exterior surface. For example, where the fissionable material layer is composed of uranium oxide enriched in $U^{235}$, the oxide may be reduced to uranium dioxide by hydrogen reduction with a simultaneous or subsequent sintering heat treatment conducted at about 1,200° C. or higher to effect hardening and consolidation of the particle to the desired extent. If desired, a non-

DRAWINGS

The method of this invention may be better understood by reference to the drawings of which:

Both of these drawings are highly diagrammatic and schematic in character.

Figure 1

Figure 1:
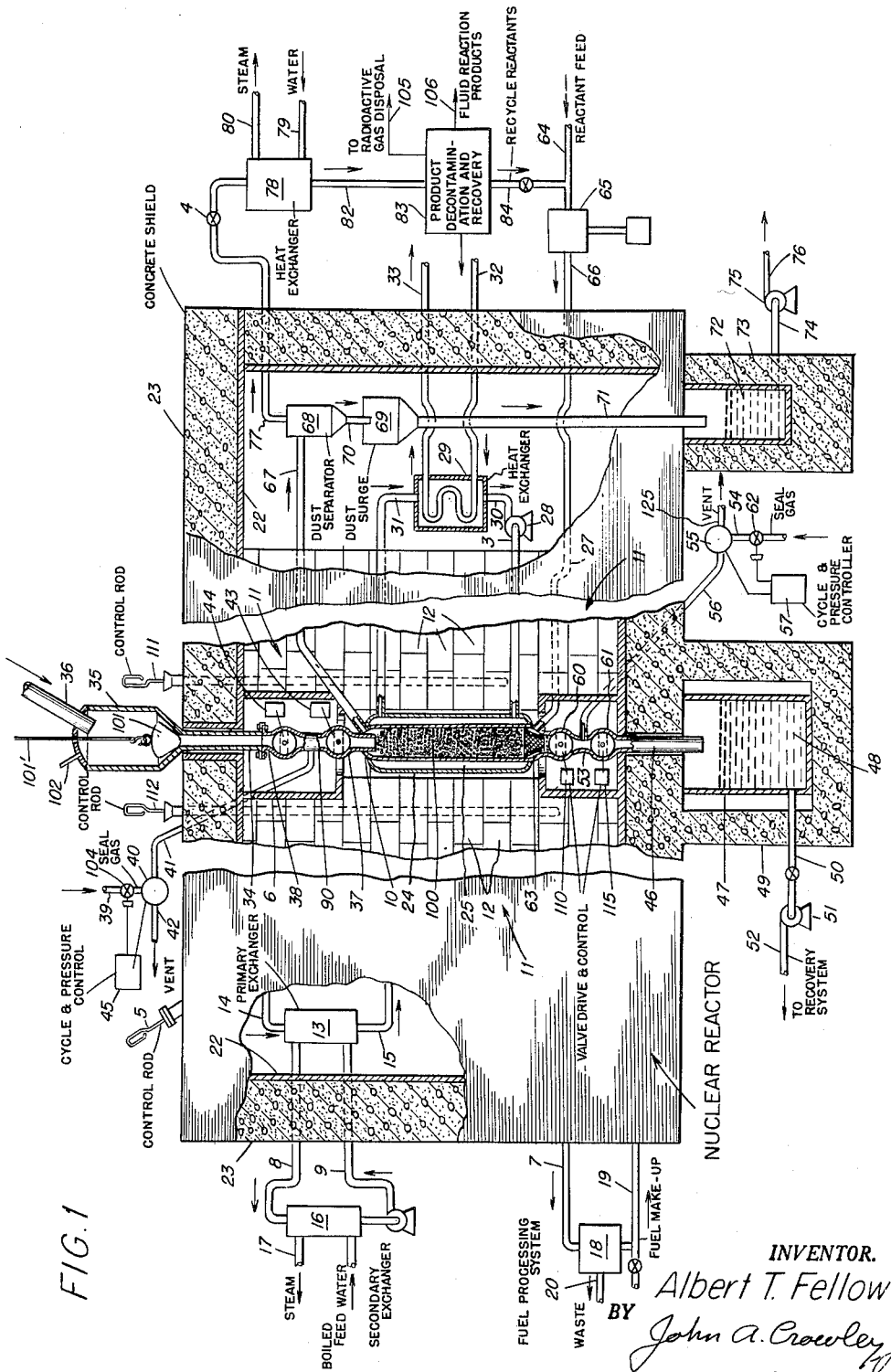
FIGURE 1 is an elevation view, partially in section, of a system for utilizing energy of nuclear fission fragments for chemical conversion of fluid reactants in accordance with this invention.

Referring now to FIGURE 1, there is shown an arrangement for conducting one form of this invention wherein the mass of contact material in the chemo-nuclear reactor 10 is incapable of maintaining a self-sustaining, neutron-multiplying fission reaction. In this form of the invention, it is necessary to supply neutrons from an outside source in order to provide fission reaction in the contact mass. In the arrangement shown, the chem-nuclear reactor is supported by members, not shown, within a region of high neutron flux emanating from the core of a self-sustaining nuclear reactor. The core of the nuclear reactor is located in or adjacent to the region 11, and the details thereof are not shown in the drawings. One of the control rods for the reactor is shown at 5. A biological shield comprising plates of iron or steel 22 and a wall of dense concrete 23 surround the entire nuclear reactor-chemo-nuclear reaction system. The self-sustaining nuclear reactor may take any of a number of forms known to persons skilled in the art, modified in arrangement to accommodate the presence of the chemo-nuclear reactor in a manner which will be apparent from the following discussion. Thus, for example, the nuclear reactor may be a liquid-metal-fuel reactor such as described by Williams et al. of Brookhaven National Laboratories in Nuclear Engineering, Part I, pages 245–252, published by American Institute of Chemical Engineers in 1954. That reactor, which is a power and breeder reactor, utilized $U^{233}$ in molten bismuth as a fuel, graphite as moderator. Around the reactor core, there is provided a graphite breeder blanket in which $U^{233}$ is bred from thorium bismuthide in liquid bismuth. Another type of nuclear power reactor which may be employed is a modified arrangement of the enriched uranium, heavy water moderated type described by J. T. Wells in Nuclear Engineering, Part I (supra) at pages 213, 277. In that reactor, $U^{233}$ is dispersed in aluminum plates as the fuel, and these are mounted in rectangular boxes which are removable as units and arranged for heavy water passage therethrough. Several such units are mounted in an aluminum tank which is surrounded by a graphite filled area to augment the region of useful neutron intensities. Alternatively, the nuclear reactor may be a graphite moderator-uranium reactor modified to permit incorporation of the chemo-nuclear reactor. In one form of the invention, the tube or tubes making up the chemo-nuclear reactor may be mounted in the moderator filled region of high neutron intensity surrounding the core of the nuclear reactor. Referring to FIGURE 1, the graphite blocks represented at 12 can be considered as constituting a portion of the moderator filled region of high neutron intensity adjacent the core of the nuclear reactor. Alternatively, the fission fuel elements of the nuclear reactor may be so arranged in the moderator field with respect to the chemo-nuclear reactor that the latter is essentially within the core of the nuclear reactor. FIGURE 1 can be alternatively taken as also showing this latter arrangement, the graphite blocks 12 comprising the moderator in the reactor core, and the fuel elements of the nuclear reactor being embedded in the moderator but not visible in the drawing. In such arrangement, the contact mass in the reactor 10 is, in essence, a portion of the nuclear reactor fuel, being confined out of fluid communication with the remainder of the fuel mass but being in gamma and neutron radiation communication therewith. With this arrangement, it is preferable that the concentration of fissionable material in the nuclear reactor be sufficient to render some aggregate of the contact material capable of effecting a self-sustaining, neutron-multiplying reaction. In a preferred form of this invention, the nuclear reactor may be employed for the purpose of producing power as well as serving as an instrument for providing fission fragments of high kinetic energy for use in chemical conversion of fluid reactants. Thus, in FIGURE 1, there is shown a primary exchanger 13 for extracting heat from a heat exchange fluid which has been circulated through the reactor core and which enters the exchanger via conduit 14 and returns to the reactor core via conduit 15. Heat exchange fluid, such as sodium or water, circulates via conduits 8 and 9 between the primary exchanger and the secondary exchanger 16 for the purpose of manufacturing steam from water. The steam passes via conduit 17 to a generator-turbine, not shown.

There is provided at 18 a system of a type known to those skilled in the art for processing the used fission fuel delivered from the nuclear reactor via conduit or duct 7. In the case of liquid fuel reactors, reprocessed and make-up liquid fuel may be returned to the nuclear reactor via conduit 19. Waste material from the fission reaction passes via conduit 20 to a suitable disposal system.

It will be understood that the choice of fissionable and moderator materials, heat exchange fluids, construction materials, the pattern of distribution of the fissionable material in the moderator, the enrichment of the fissionable material and methods therefor, the critical size of the reactive composition comprising fissionable material and moderator required to maintain the self-sustaining reaction, and the means employed to remove the heat generated by the fission reaction, in themselves, do not constitute the present invention, being now known to persons skilled in the art, as exemplified by references cited hereinabove.

Referring now to the chemo-nuclear reactor 10 in FIGURE 1, the reactor shell and other structural members should be constructed of material having as low a neutron capture cross-section as possible while, at the same time, being adapted to dependably confine the reactant fluid and withstand severe corrosion under the temperature, pressure, and radiation conditions involved. In general, construction materials employed should have a thermal neutron capture cross-section below about 3 barns. Zircaloy (a zirconium alloy containing about 1 to 2% tin and traces of iron, nickel and chromium), aluminum and certain stainless steels may be employed for the reactor shell. For some low pressure operations, the reactor cavity may be formed in a block of graphite which has been suitably treated to render it essentially impermeable to the reactant fluids involved. A jacket 24 is connected around the reactor shell to provide an annular space 25 through which a heat exchange fluid may be circulated for the purpose of removing heat from the contact mass 100 within the reactor. The fluid is circulated from jacketed space 25 via conduit 31 to heat exchanger 29, thence via conduit 30 to pump 28 and then back to space 25 via conduit 3. Any of a number of suitable heat exchange fluids may be employed, depending upon temperature conditions involved, such as ordinary water, heavy water, usually under pressure, molten bismuth or sodium, suitable mixtures of biphenyl and diphenyl oxide, lead-bismuth eutectic mixture or a suitable molten mixture of sodium nitrate, sodium nitrite and potassium nitrate. The primary heat exchange fluid may be cooled in exchanger 29 by means of water entering via conduit 32 and leaving either as pressurized water or steam via conduit 33. A contact material feed conduit 34 is connected through the closed upper end of the reactor 10 and depends a short distance down into the reactor so as to provide in the upper section of the reactor a plenum space for vapor reactant disengagement from the contact material bed 100. The contact material feed conduit extends upwardly from the reactor 10 to a supply hopper 35 located outside the concrete shield 23. Contact material is supplied to the hopper 35 via chute 36. A removable concrete plug 101 is positioned in the bottom of hopper 35 so as to cover the upper end of conduit 34 during periods of operation when contact material is not being supplied to the reactor. The hopper 35 is closed on its upper end and is provided with a vent 102, which delivers any gas escaping up through conduit 34 to an elevated stack. A seal lock section 90 is provided at an intermediate point along conduit 34 between two automatically operated plug valves 37 and 38. Inert seal gas is supplied to the lock section from supply conduit 39 via three-way valve 40 and conduit 41. The lock section may be vented through conduit 41, valve 40 and vent conduit 42, the latter being connected to an elevated discharge stack, not shown. Valves 37 and 38 are driven by suitable conventional means shown schematically at 43 and 44, respectively, the timing and operation of which are controlled by instrument or instruments 45. The latter instrument or instruments also control operation of three-way valve 40 and the pressure control valve 104 on the inert gas supply conduit 39. The area in which the valves 37 and 38 are located may be shielded against radiation by suitable shield material shown at 6 or the valves may be located outside the biological shield 23. A contact material discharge conduit 46 extends downwardly from the lower end of reactor 10 to discharge tank 47 which contains a pool of water 48. The tank 47 is surrounded with a protective concrete shield wall 49. After the radioactive contact material in the pool 48 has been permitted to cool, it may be pumped from the tank 47 via conduit 50, pump 51 and conduit 52 to a suitable recovery system, not shown, in which it is processed for recovery of unused fissionable material and other values. A seal lock section 53, similar to section 90, is provided on conduit 46 between automatic plug valves 60 and 61. Inert gas is introduced to lock section 53 via conduit 54, three-way valve 55 and conduit 56. Cycle and pressure control instrument 57 controls the operation of the drive mechanism for valves 60, 61 and 55 and also controls the pressure control valve 62 on the seal gas inlet conduit. A vent to stack 125 is also connected to the three-way valve 55. Adjacent the location at which the conduit 46 connects into the bottom of the reactor 10, there is provided a ring-shaped, foraminate partition or screen 63 shaped to permit attachment along its edges to the side shell and bottom of the reactor so as to provide an annular plenum space for fluid reactant distribution. Fluid reactant feed is delivered into the space provided by screen 63 through conduit 66, which connects through the reactor shell at the location of the distribution space. A conduit 67 connects into the upper section of the reactor 10 above the discharge end of conduit 34 and connects on its other end into dust separator 68. A dust surge tank 69 is positioned below separator 68 and communicates therewith through separator drain conduit 70. A drain conduit 71 extends downwardly from surge tank 69 to the water pool tank 72, which is shielded by concrete wall 73. Radioactive contact material dust may be discharged from tank 72 via conduit 74 and pumped by pump 75 through conduit 76 to a suitable processing plant for recovery of fissionable material. Fluid conversion products may be passed from the top of separator 68 via conduit 77 to heat exchanger or boiler 78, in which the products are cooled with resultant vaporization of cooling water entering via conduit 79. The resulting steam may be passed via conduit 80 to a generator-turbine or utilized for other purposes.

Cooled products from chemical reaction pass from exchanger 78 via conduit 82 to suitable product decontamination and recovery system 83. A conduit 84 leads from system 83 to feed pump or compressor 65 for recycling of reactants.

FIGURE 1—OPERATION

For the purpose of discussing the operation of the arrangement shown in FIGURE 1, its use for the chemical conversion of a mixture of steam and propane vapor to carbon monoxide and hydrogen at about 800–1000° F may be considered. This reaction takes place only after supply of substantial amounts of free energy. The contact mass employed in this instance is comprised of generally rounded pellets comprising a core portion having a nominal diameter of about 2,500 microns and composed of beryllium oxide and a fissionable material-containing portion having a thickness of about 1,500 microns and composed of microporous alumina containing dispersed uranium and nickel. The particles are about 5,500 microns in overall nominal diameter and have a loose bulk density of about 100 pounds per cubic foot. The surface area of the alumina layer is about 300 square meters per gram, and the pore volume is about 35% of the total particle volume. The micropore volume is about 90% of the total pore volume. The alumina layer contains about 5% by weight nickel and very finely dispersed uranium enriched to about 80% in $U^{235}$. The amount of uranium in the particles is about 4% by weight calculated on total particle basis. The core portion is substantially free of fissionable material.

The contact material mass is arranged in the reactor 10 in the form of a substantially compact bed 100. The beryllia in the particle cores and, to some extent, the alumina in the fissionable material-containing layer of the particles act as moderator for neutrons released by fission of the fissionable material in the pellets.

The reactor 10 is so positioned in the graphite blanket surrounding the nuclear reactor that the thermal neutron flux radiated through the walls of the reactor and into the contact mass is, in the absence of control rods, of the order of $1 \times 10^{11}$ to $1 \times 10^{12}$ neutrons per square centimeter per second. As a result, the $U^{235}$ in the contact material is caused to undergo fission. In this case, the amount of the mass 100 and of the fissionable material therein is such that the mass 100 is incapable of supporting a self-sustaining, neutron-multiplying reaction, but is capable of a neutron-multiplying reaction as long as outside neutrons are irradiated into the mass. The gaseous reactant feed stream consisting of about 80 mole percent steam and 20 mole percent propane is supplied via conduit 64 to compressor 65 and is forced through conduit 66 into the bottom of reactor 10. If desired, the feed may be preheated to reaction temperature in a suitable heater, not shown, inserted between the compressor 65 and the reactor 10. The reactant gas passes upwardly through the mass 100 at a pressure of about 5 p.s.i.g., controlled by valve 4, whereby it is converted as a result of contacting the microporous particles in the presence of high energy fission fragments resulting from fission of the $U^{235}$. Fluid conversion product containing hydrogen, carbon monoxide and unconverted feed material is withdrawn from the upper section of the reactor 10 via conduit 67. Any small traces of contact material dust or carbon formed in the reaction separate in dust separator 68, which may take any of a number of known forms adapted for the purpose. Separated dust falls into the surge tank 69 and from thence via conduit 71 into the pool of water in tank 72. Conversion product passes from separator 68 to exchanger or boiler 78, where it is cooled by indirect heat exchange with water. The cooled product passes to system 83, where it is treated in suitable manner to eliminate dangerously radioactive materials and then subdivided to the extent desired by conventional methods into constituent chemical components which are withdrawn at 106. Because of the shape and sizing of the particles, substantially all of the normally solid fission fragments are retained in the contact material particles. Hence, the product decontamination process is substantially simplified. In general, this involves separation of radioactive gases (withdrawn at 105) and permitting the chemical products to "cool" for sufficient time to permit decay to a safe level of any radioactive isotopes formed as a result of subjection of the reactant fluid to irradiation in the reactor. Methods for effecting radioactive decontamination of fluid chemical materials are known to those skilled in the art and are based on combination methods which vary somewhat, depending upon the materials involved. In general, these methods rely on aging to permit decay of radioactive materials, followed by filtration through fine filters or porous adsorptive materials to remove the solids into which these materials decay. It will be understood that methods for effecting decontamination and separation of fluid chemical products are not, in themselves, the subject of the present invention.

The contact material in reactor 10 is maintained at the desired conversion temperature, in this instance about 800–1000° F., by heat exchange with suitable cooling fluids circulated through the jacketed space 25. When the concentration of fissionable material in the contact material is high in accordance with the preferred form of the invention, the fission reaction releases energy in excess of that required for the chemical conversion. The excess energy is converted to heat. This heat is also recovered in the form of steam in exchanger 29. In some cases, when the concentration of fissionable material in the contact material is relatively low, the energy released by fission may be insufficient for both effecting the chemical conversion and also compensating for convection and radiation heat losses from the system. In such cases, the fluid circulated through the jacketed space 25 may be a heating fluid to compensate for radiation and convection heat losses from the reactor.

After a sustained period of use, it may be necessary to replace the contact material either because of accumulation of contaminants deposited during the chemical reaction (in this case, carbonaceous contaminants) or because of accumulation of undesirable fission fragments and gradual depletion of $U^{235}$ in the contact material. It is contemplated that the chemo-nuclear reactor may be operated while contact material is supplied to and withdrawn from the reactor in an essentially continuous manner. However, for most operations, complete change of contact material in the reactor may be made only during infrequent off-stream periods, or the contact material may be changed batchwise by withdrawing and replacing small portions of the reactor bed periodically during the reactant conversion period. During periods when contact material is not being charged to or discharged from the reactor 10, the plug valves 37, 38, 60 and 61 are in closed position, and an inert gas such as steam, helium, carbon dioxide, etc. is admitted to the lock chambers 90 and 53 via conduits 41 and 56, respectively. By means of control instruments 45 and 57, and pressure control valves 104 and 62 which are actuated thereby, the inert gas pressure in the closed lock sections 90 and 53 is maintained at about one-quarter to one-half pound per square inch above that in the reactor 10, thereby preventing escape of reactants or other gases from the reactor via conduits 34 and 46. In this respect, the instrument systems 45 and 57 serve the function of differential pressure control instruments. When it becomes desirable to discharge contact material from the reactor 10, instrument system 57 is caused to change the setting of the three-way valve 55 so as to close off admission of inert gas via conduit 54 and to vent the gas from the lock chamber via vent 125. Thereafter, by means of suitable control instruments in system 57 which control the operation of drive mechanisms 110 and 115, valve 60 is caused to open for a measured time so that a portion of the contact material from reactor 10 flows into lock section 53. If desired, inert purge gas can be caused to enter the section 53 during this period so as to purge reactants from the contact material. Valve 60 is closed before the section 53 becomes filled with contact material. Valve 61 is then similarly caused to open, and the contact material falls from section 53 into the water pool 48. Thereafter, valve 61 is closed, and inert gas in again admitted to the lock section 53 so as to maintain the desired seal pressure therein. By a similar operation of lock section 90, fresh contact material is supplied onto the top of the bed 100 in order to replace the portion of the contact material which has been removed.

SUPPLEMENTAL MODERATION

In some cases, it may be desirable to supplement the moderating effect of the contact material particles by mixing with the particles making up the mass separate pieces or particles of moderator material such as graphite or beryllium oxide. In general, such material should have a capture cross-section for thermal neutrons less than about 100 millibarns. Alternatively, a portion of the reactor structural members may consist of graphite or beryllium or a compound of beryllium, or uniformly spaced rods or bars may be positioned across the portion of the reactor occupied by the contact material bed. Additional moderation may be obtained in some cases by employing heavy water as the heat exchange fluid circulated through the cooling tubes or jacket in the reactor. When the fluid reactant is a hydrogenous material such as hydrocarbons or hydrocarbon derivatives, the fluid reactant stream serves at least in part as the moderator. When the hydrocarbon reactant is in the liquid phase it is especially effective as a neutron moderator because of its increased concentration. Also, a moderating material such as heavy water, light water, hydrocarbons or hydrogen may be added to the fluid reactant stream to supply or augment the moderator properties of the reactor system.

CONTROL OF NEUTRON FLUX

Depending upon the condition of the contact material and desired severity of reactiion and the rate of reactant flow through the reactor, in accordance with the preferred forms of this invention, it is desirable to adjust the neutron flux in the contact material mass from time to time in order to promote fission of the fissionable material in the microporous solids at a rate at least sufficient to provide the energy required for the desired chemical conversion or transformation of the fluid reactants. The neutron flux in the mass may be controlled either by control of the number of free neutrons present or by control of the neutron speed by moderation. One way of adjusting the amount of moderator in the reactor is by controlling the amount of neutron moderating material in the fluid reactant feed and by controlling the rate of fluid reactant feed flow through the reactor. While it is undesirable to add to the feed materials having very high neutron capture cross-sections, it will be understood that frequently some components of the fluid feed stream may have higher neutron absorption capacities than others. Hence, to some extent, the neutron flux in the mass may be influenced by control of the amount of neutron absorbing material in the feed and the rate of feed flow through the conversion zone. In the system shown in FIGURE 1, the neutron flux may be adjusted by insertion into or withdrawal from the mass within the reactor of cadmium-containing or boron-containing control rods through suitable sheaths, not shown. Alternatively, the neutron flux in the contact mass may be controlled by regulating the thermal neutron flux in the region in which the reactor 10 is located. Thus, where the reactor is positioned in a graphite-filled region adjacent the nuclear reactor core, cadmium-containing or boron-containing control rods may be inserted into or withdrawn from the graphite blanket at points around the reactor 10. Two such rods 111 and 112 may be seen in the drawing.

ALTERNATIVE ARRANGEMENTS

As indicated above, when the mass of contact material in the reactor is itself incapable of effecting a self-sustaining, neutron-multiplying reaction, an atomic reactor is the preferred outside source of neutron supply. However, it is contemplated that neutrons may be supplied by other means, for example, the provision around the outside or inside of the reactor of suitably clad capsules or members containing a mixture of metallic beryllium and an alpha particle emitter such as radium or a polonium compound. Other possible neutron sources are antimony containing 60-day Sb-124 surrounded by metallic beryllium or a mixture of $Pu^{239}$ and beryllium.

While, in the arrangement of FIGURE 1, only a single reactor tube of relatively small diameter, surrounded by a cooling jacket, is shown, modified arrangements are contemplated for reactors of greater capacity. For example, large reactors may take the form of a tube and shell type vessel with the contact material positioned either inside or outside of the tubes while the liquid heat transfer fluid is circulated through or around the opposite sides of the tubes. In arrangements of this type, the external neutron source may be desirably positioned within the reactor shell, either within or without the tubes therein, in order to provide uniform neutron flux in all portions of the contact material mass.

In other alternative arrangements, provision for cooling or heating the contact material mass by indirect heat transfer may be omitted in whole or in part and the rate of fluid reactant flow through the mass and the inlet temperature thereof may be regulated to effect, in whole or in part, heating when necessary and, more frequently, removal of excess fission energy from the mass as increased sensible heat in the conversion product stream. This may be accomplished by diluting the fluid reactant stream with a suitable heat-carrying fluid which is of low neutron capture cross-section and which may be essentially inert under reactor conditions or by recycling unconverted reactant (in this case, propane and steam) from the product recovery system 83 to the reactor via conduit 84, compressor 65 and conduit 66. If desired, a portion of the total cooled reaction product stream withdrawn from exchanger 78 may be bypassed around the product recovery system 83 and recycled to the reactor 10. In this manner, the temperature of the mass 100 may be controlled, and, at the same time, the concentration of desired products in the portion of the product stream supplied to the product recovery system 83 may, in some cases, be increased.

Beyond the limit of providing sufficient fission in the microporous solids to effect the desired chemical conversion of the fluid reactants, the thermal energy released in the reactor 10 may be controlled by control of the neutron flux maintained in the contact material mass. As indicated above, this can be accomplished by adjustment of control rods 111 and 112.

In general, only a relatively small fraction of the kinetic energy of the fission fragments released upon fission of the fissionable material in the microporous solids is ultimately converted to chemical energy, and the remainder is converted into thermal energy. It is, therefore, very desirable from the standpoint of overall economics of the system to recover the excess energy from the fission fragments which has not been converted to chemical energy in a form which can be converted to power as shown hereinabove in connection with exchangers 29 and 78.

In order to prevent contamination of the microporous contact material with materials having a high neutron capture cross-section such as boron, cadmium, antimony, cobalt, lithium, etc., the fluid reactant feed should be treated, if necessary, to remove such materials prior to passage through the reactor. Usually, it is preferred also to exclude sulfur and nitrogen and compounds thereof, except in the case of certain chemical conversions necessarily involving these materials.

Figure 2

Figure 2:
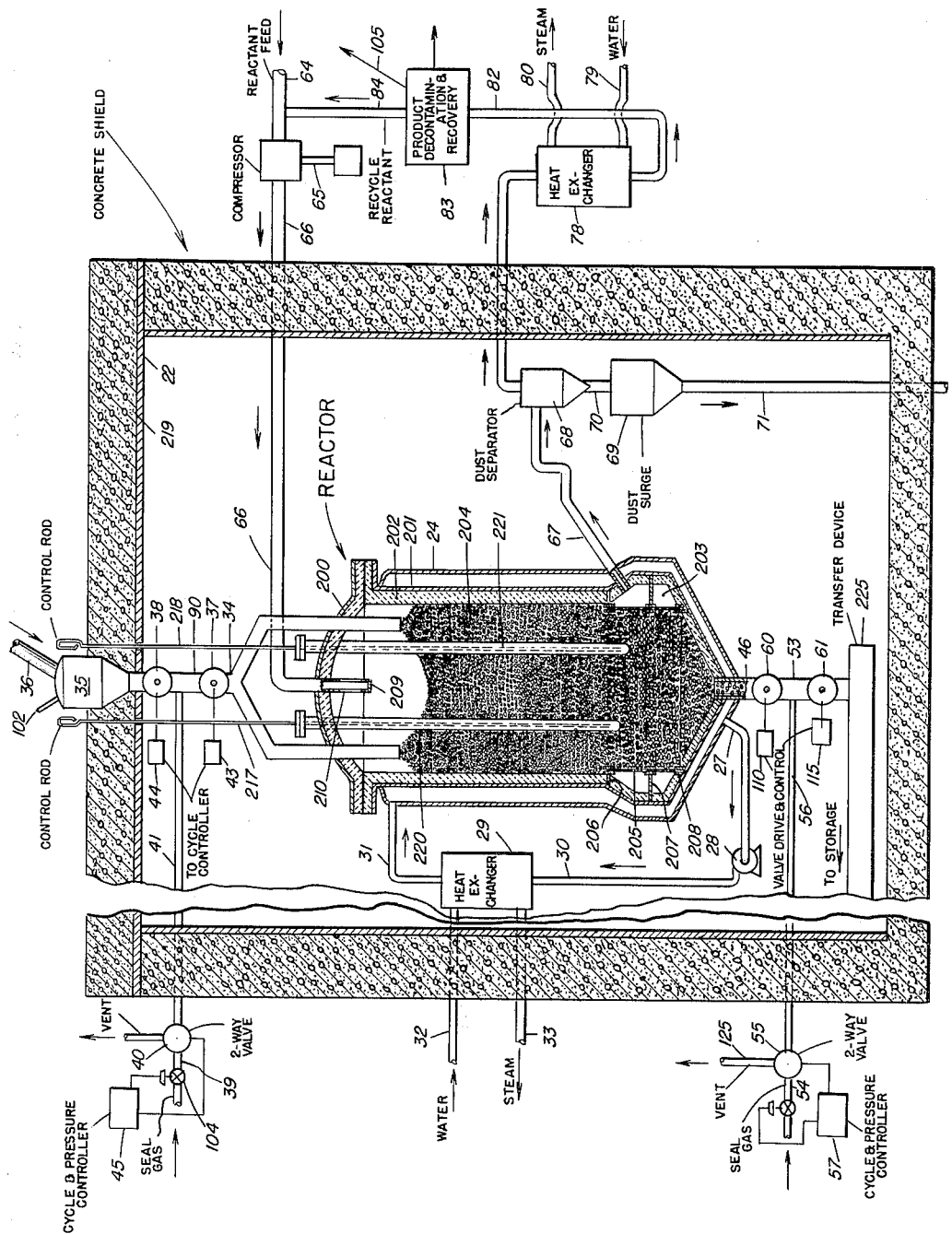
FIGURE 2 is an elevation view, partially in section, of a modified arrangement according to this invention in which the chemo-nuclear reactor is capable of maintaining a self-sustaining, neutron-multiplying fission reaction.

Referring now to FIGURE 2, there is shown a modified chemo-nuclear reaction system in which the geometry and arrangement of the reactor and contact material mass and the concentration of fissionable material are such as to render the mass capable of effecting a self-sustaining, neutron fission reaction. Suitable moderation for the neutrons released by fission occurring within the particles being provided, an outside source of neutrons is not required for operation of this system, other than as an aid in its start-up. The contact material may be made up of one-quarter inch average nominal diameter, microporous, activated carbon particles comprised of an inner core portion substantially free of fissionable material and having a nominal diameter of about 2,000 microns, a fissionable material-containing portion and a fissionable material-free shell portion, the latter having a thickness of about 100 microns. These particles are prepared by soaking preformed, pelleted, activated carbon particles in molten wax, using a method analogous to that described in United States Patent No. 2,856,367; and, thereafter, wax in all except the core portion of the particles is removed by controlled solvent washing. The particles are then impregnated with uranyl acetate containing 70% enriched $U^{235}$. The particles are dried and heated in inert or reducing atmosphere to decompose the acetate to the oxide. The particles are again soaked in wax. The wax is this time removed only from the shell portion of the particles by means of suitable wax solvent. Thereafter, the uranium is dissolved from the shell portion of the pellets using a suitable acid such as dilute nitric acid. Thereafter, the pellets are washed, solvent treated to remove the remainder of the wax, dried, heated at an elevated temperature in a nitrogen or hydrogen stream at 800–950° F. until the dew point of the hydrogen is about 30° F. and finally heated in a hydrogen stream to reduce the uranium. The final particles contain 20% by weight uranium enriched to 70% $U^{235}$. The total $U^{235}$ in the contact material in bed 204 is about 6 kg. In this arrangement, the microporous carrier material also serves to thermalize the neutrons released by fission of the $U^{235}$ in the particles.

The reactor 200 has a stainless steel shell 201 and jacket 24 and an internal lining of beryllium oxide 202 which acts as a neutron reflector. The lower section of the reactor is expanded in cross-section to provide an annular reactant withdrawal space 203 which is separated from the critical mass of contact material 204 by a ring-shaped screen or perforated plate baffle 205. The baffle 205 is fastened to the vessel wall by suitable braces shown at 206, 207 and 208. The jacket heat exchange system, the fluid reactant feed arrangement and product recovery system and the means for adding contact material to the reactor and withdrawing contact material therefrom are all similar to those shown in FIGURE 1 and bear like legends. These features require no further description other than mention of points of minor difference. The reactant manifolding differs from that shown in FIGURE 1, principally in providing for downward flow of reactant fluid through the bed 204 rather than upward flow. This permits somewhat higher reactant throughput velocities without disturbance of the contact material bed. The fluid inlet conduit 66 is closed on its end 209 within the reactor, and lateral openings 210 are provided so that entering vapors do not impinge directly down onto the bed surface. While the arrangement shown may be employed for liquid phase operations, it is preferred for vapor phase operations. It will be understood that, for liquid phase operations, somewhat modified arrangements may be provided for distribution of the liquid feed onto the bed 204 and for withdrawal of liquid products therefrom. Such modified arrangements are well known to those familiar with design and operation of reactors adapted for contacting of liquid reactants with beds of particle-form contact materials. The same is true of the equipment employed for separation of entrained dust from fluid conversion products.

A plurality of control rod sheaths, of which two are shown at 220 and 221, connect through the top of reactor 200 and depend down into the reactor. Cadmium- or boron-containing control rods 217 and 218 may be inserted or withdrawn from these sheaths from a location outside the biological shield 219. It will be noted that the biological shield 219 encloses the reactor, jacket exchanger and product dust separation system. If desired, the exchanger 78 may also be positioned within the shielded area, and a normally liquid primary cooling fluid may be substituted for water in this exchanger. In this case, the primary cooling fluid from exchanger 78 is circulated to a secondary exchanger or boiler, not shown, in which heat removed from the conversion product is exchanged with boiler feed water.

Suitable contact material storage tanks, not shown, may also be provided within the shielded area for storage of the contact material when the reactor 200 is not in use. These tanks should be of such limited size and suitably separated from each other as to permit storage of the contact material without danger of self-sustaining fission reaction occurring. A suitable contact material transfer system 225 is connected to the discharge end of conduit 46 for transfer of discharged contact material to the storage tanks.

FIGURE 2—OPERATION

In operation of the system shown in FIGURE 2, the mass of contact material 204 becomes critical upon withdrawal of a suitable number of control rods 217 and 218. The extent of the fission reaction may be regulated by means of the control rods, and the fission reaction may be stopped by inserting a sufficient number of the rods into the sheaths 220 and 221. As indicated hereinabove, the neutron flux and amount of fission occurring may be controlled at least in part by regulation of the amount of neutron moderating material in the confined zone, for example by adjusting the amount of moderator material such as steam added to the conversion zone with the reactant feed. The neutron flux in the mass 204 is usually maintained at an intensity level of the order of $10^{12}$ to $10^{13}$ neutrons per square centimeter per second.

In the arrangement shown in FIGURE 2, the temperature in the mass 204 is controlled at the desired level principally by recycling fluid reactant, cooled to a temperature substantially below the desired conversion temperature, and controlling the total rate of reactant flow through the reactor. A minor portion of the excess thermal energy may be removed by means of the jacket heat exchange system. It is also contemplated that heat transfer tubes may be provided inside the reactor to remove most or all of the excess energy released by the fission reaction.

ALTERNATIVE ARRANGEMENT AND SUBCOMBINATION OF INVENTION

In an alternative operation of the system shown in FIGURES 1 and 2, the geometry of the contact material mass and concentration of fissionable material therein may be such as to render the mass capable of effecting only a subcritical neutron-multiplying reaction and removable rod or strip containing a substantial concentration of fissionable material may be inserted into the mass when desired to render the entire assembly, including the rods, critical, whereby a self-sustaining, neutron-multiplying reaction is effected in the chemo-nuclear reactor. Such rods may be adjustably inserted into sheaths which extend into the mass 204, such as sheaths 220 and 221 in FIGURE 2. When it is desired to stop the fission reaction the rods may be lifted in the sheaths sufficiently to at least remove them from the mass 204. While the rods contain insufficient fissionable material to independently support a self-sustaining neutron-multiplying fission reaction, they will contain radioactive material when removed from the reactor. Hence it is convenient to incorporate fissionable material only along the lower portion of the rods so that when the rods are withdrawn the fissionable material-containing portion thereof will remain within the the confines of the biological shield. It is contemplated that this method for controlling the operation of nuclear reactors is not restricted in application only to chemo-nuclear reactor systems. In this respect the invention is considered broad to a method for conducting nuclear fission reactions which involves maintaining a confined mass, preferably in form of a substantially compact bed, of particle-form fissionable-material containing solids in which the total amount and concentration of fissionable material is insufficient to render the mass capable of effecting a self sustaining neutron multiplying nuclear fission reaction, but preferably sufficient to render the mass capable of sustaining a neutron multiplying fission reaction. When it is desired to render the mass critical, one or more members are inserted into the mass either directly or in sheaths, which members contain fissionable material in sufficient concentration and amount to render the mass critical. Suitable neutron moderator materials such as any of those discussed hereinabove are maintained in the mass to thermalize the neutrons.

If desired neutron absorbing control rods may also be provided, but it is preferred to effect control of the fission reaction by regulation of the amount of removable fissionable-material-containing members inserted into the mass. The fission reaction may be stopped by withdrawing a sufficient number of these latter members from the region of the mass of particle-form material. Such a reactor may be operated as a chemo-nuclear reactor as above indicated or merely as a power or breeder reactor. It will be understood that a primary heat-exchange fluid may be circulated through suitable tubes or channels provided in the mass for purpose of removing heat energy therefrom or a heat-exchange fluid may be passed through the bed in direct contact with the solids as or similarly to the reactant flow in the chemo-nuclear reactor. Heat may be recovered from the primary fluid in a secondary heat-exchange system and thereafter converted to power in conventional manner.

Preferably the solid particles partake of one of the forms hereinabove described in connection with the chemo-nuclear reactors. Alternatively the particles may partake of any of the forms described in my above mentioned copending applications Serial Number 24,124 and Serial Number 24,126 or the solid particles may partake of other forms, for example, spheres of uranium oxide enriched in $U^{235}$ or pellets of ceramic material containing plutonium-239. In general the particles should have nominal diameters less than one inch and greater than about 150 microns, and preferably greater than one-tenth inch. It is preferred that the uranium containing members which are inserted into and withdrawn from the mass to effect control be in the form of rods, tubes, sheets or slabs which can conveniently inserted into the mass of particles or withdrawn therefrom without removal of the particles from the confining zone. However, when suitable, spaced sheaths are provided which extend into or longitudinally transversely or diagonally across that portion of the confined zone containing the particle-form mass, the fissionable material containing control members may be in the form of balls, slugs or other forms adapted for easy insertion into and removal from the portion of the sheaths within the mass region. Preferably, the sheaths are constructed of a material having a low neutron capture cross-section and good moderator properties. Generally the concentration of fissionable material in the control members is substantially greater than that in the particles making up the mass.

It will be understood that suitable heat-insulating material may be provided around the shells of the chemo-nuclear reactors shown in FIGURES 1 and 2 when chemical reactions are conducted therein at temperatures substantially above or below atmospheric temperatures.

APPLICABILITY OF INVENTION

The method of the present invention is broadly useful in the conduct of a very large number of chemical conversions and transformations of different types. In general, the invention is applicable to chemical conversions or transformations of fluid reactants (i.e., liquid or gaseous reactants) to products which are at least mostly fluid and are of different chemical composition, which conversions or transformations require supply of substantial amounts of energy. It should be understood that reference herein, in describing and claiming this invention, to conversions or transformations which "require supply of substantial amounts of energy" is intended to mean:

(A) Chemical conversions or transformations which can be effected only by supply of a substantial quantity of free energy. This includes highly endothermic reactions among certain others.

(B) Conversions or transformations not requiring supply of a substantial quantity of free energy but requiring supply of a substantial quantity of activation energy in order to effect their progress.

Where the chemical conversion may be started and will continue indefinitely spontaneously or upon supply of only small amounts of energy, the use of the present invention is unnecessary. The uncontrolled combustion by burning of gaseous and light liquid hydrocarbon fuels is an example of the latter type of conversion. Usually, the invention would not be employed for strongly exothermic chemical reactions except in those cases where the reaction will not initiate except upon supply of a substantial quantity of initial energy. For practical reasons, the invention is not applicable to conversions in which the reactants have thermal neutron capture cross-sections above about two barns.

Reactant feeds or feeds leading to conversion products, which under the process conditions cause serious, permanent impairment of these properties of the contact material which render it useful for the chemo-nuclear process involved are generally not employed in the process of this invention. The same is true of feeds which cause removal from the porous contact material by solubilizing or leaching of contained catalytic compounds or of fissionable material or of the retained normally solid fission fragments, except in such cases where removal of such compounds is specifically desired. In some cases specific reactants may be objectionable only in the case of certain contact materials, for example, water and water vapor at high temperatures would react with activated carbon but would not be objectionable where the porous carrier material is pumice.

It is necessary to exclude chlorine and compounds thereof where the contact material contains aluminum, iron, chromium and uranium and the operating conditions would be such that volatile chlorides of these metals would be formed.

Examples of a large number of chemical reactions which may be caused to occur by subjection of the reactants, either in the presence or absence of porous or catalytic solid materials, to irradiation by alpha particles, neutrons, beta rays or electromagnetic gamma radiations have been disclosed in prior art cited hereinabove. Similarly, examples of chemical reactions which may be caused to occur in the presence of nuclear fission fragments, either in the presence or absence of porous contact materials, have also been disclosed in some of the prior art references hereinabove referred to. Within the limits of the applicability of this invention outlined in the two paragraphs next above, the method of the present invention may be applied to the many different chemical conversions described in the above-mentioned prior art with the resultant advantages which have been indicated herein to be derivable from this invention. Other chemical conversions and transformations to which this invention is applicable and the types of porous contact materials which may be used in that connection have been specifically mentioned hereinabove in connection with the discussion of the microporous carrier material and of compounds which may be added to said carrier for the purpose of providing beneficial catalytic influence on the chemical reactions involved. Without any intention of limiting the scope of the invention thereto, some typical chemical conversions to which the method of the present invention may be beneficially applied and which appear worthy of further mention are listed hereinbelow:

(A) Chemical reactions of the type wherein a carbon-hydrogen, carbon-carbon or other chemical bond is ruptured with resultant formation of molecular fragments which recombine to form dimers; for example, the conversion of methanol to diethylene glycol and hydrogen over porous, contact material particles composed of pumice, kieselguhr, diatomaceous earth or silica gel having only the outer portions thereof impregnated with fissionable material so as to provide a fissionable-material-free core portion. Temperatures employed in the chemo-nuclear reactor may be of the order of 50 to 200° F., and pressures may range from atmospheric to 200 p.s.i.g.

(B) Reactions between dissimilar organic compounds wherein fragmentation of the molecules of each compound occurs and these fragments may combine with like to dissimilar fragments to produce a mixture of products. An examples of such a reaction is the conversion of an ethanol-hexane mixture to butanediols, octanols and dodecanes. The fissionable material layer of the contact material particles in this case may be composed of pumice, kieselguhr or silica gel and the fissionable-material-free core portion may be composed of the same carrier material as of carbon or beryllia. Conditions in the chemo-nuclear reactor may include temperatures in the range of 50 to 200° F. and pressure of the order of atmospheric to 10 atmospheres.

(C) Synthesis reactions, for example, the converison of nitrogen and oxygen to oxides thereof at 200 to 400° F. and 5 to 20 atmospheres, in the presence of a contact material mass made up of porous silica gel particles having fissionable-material-free core and jacket portions and an intermediate layer impregnated with fissionable material. Another example is the synthesis of ammonia from nitrogen and hydrogen, the synthesis of methane from carbon monoxide and hydrogen, over a contact material mass made up of spheroidal particles, each particle comprising an inner portion composed of microporous silica gel in which the pores are filled with carbon and an outer portion composed of microporous silica gel containing a dispersed mixture of the oxides of uranium (enriched in U-235), iron and smaller amounts of potassium and aluminum which have been partially reduced by heating in a rapid stream of hydrogen at 800–950° F. until the dew point of the hydrogen stream is about 30° F. Operating temperatures and pressures are somewhat lower than these employed in the art for effecting ammonia synthesis over similar catalysts in the absence of nuclear fission. Another example is the synthesis of methane from carbon monoxide and hydrogen over alumina containing nickel and uranium. Such contact material is prepared by adding ammonium hydroxide solution to a solution of aluminum nitrate to precipitate alumina gel. The precipitate is washed, mixed with hydrogenated corn oil and formed into spherical particles. The particles are dried and calcined at gradually increasing temperatures up to 1100° F. The particles are then heated in an air stream to burn the binder from only the outer portion, leaving the pores of the core portion filled with binder material. The particles are then impregnated with U-235 enriched uranyl nitrate, followed by heating in a nitrogen stream to convert the nitrate to the oxide of the uranium. The particles are then impregnated with nickel nitrate and heated in a nitrogen stream to decompose the nitrate, then heated in a hydrogen stream at 800–950° F. to reduce the nickel and uranium oxides. The chemo-nuclear conversion is conducted at 100–600° F. and 1–10 atmospheres.

(D) Decomposition of stable compounds, for example, decomposition of carbon dioxide to form carbon monoxide and oxygen in the presence of small quantities of added nitrogen dioxide and in the presence of contact material made up of porous particles of pumice of silica gel having fissionable-material-free cores and containing dispersed uranium oxide in the portion of the particles surrounding the cores. Moderate conditions of temperature and pressure may be employed in the chemo-nuclear reaction zone.

(E) Hydrogenation of hydrocarbons and other organic compounds and sulfur compounds. As an example, olefinic gasoline may be hydrogenated over a catalyst comprising alumina impregnated with nickel or platinum and containing suitable quantities of fissionable material. Particles have fissionable material free alumina core and jacket and fissionable material containing alumina intermediate layer. Both latter layer and jacket also contain nickel or platinum. Temperatures for this conversion are in the range of 0 to 800° F., pressures in the range of 50 to 500 p.s.i.g. and space velocities in the range of 0.05 to 30 volumes of liquid feed measured at 60° F. per volume of contact material per hour. Hydrogen or hydrogen-containing gases are added with the hydrocarbon feed.

(F) Dehydrogenation of hydrocarbons, for example, the dehydrogenation of butane to butylenes, of naphthenes to aromatics or of paraffinic hydrocarbons in the gasoline boiling range to olefinic hydrocarbons over platinum or chromia on alumina containing halogen and containing suitable quantities of fissionable material or over platinum or chromia on silica alumina at temperatures in the range of 0 to 500 p.s.i.g. and space velocities in the range of 0.1 to 30 volumes of liquid feed (measured at 60° F.) per volume of contact material per hour. Particles have beryllia-alumina core which is free of fissionable material. Hydrocarbon gases may be added with the hydrocarbon feed.

(G) Aromatization of paraffinic hydrocarbons over such contact materials as platinum on charcoal or planium on alumina containing halogen and containing fissionable material in the presence of hydrogen and at temperatures in the range of 400 to 1,000° F., pressures in the range of atmospheric to 1,000 p.s.i.g. and space velocities in the range of 0.05 to 40. Particles may have fissionable-material-free graphite core.

(H) Dealkylation or demethylation of alkyl aromatic hydrocarbons, for example, demethylation of toluene to form benzene over microporous silica-alumina contact material or alumina impregnated with chromia and containing fissionable material in the presence or absence of added free hydrogen and at temperatures in the range of 300 to 1,000° F., pressures in the range of atmospheric to 1,000 p.s.i.g. and space velocities in the range of 0.05 to 40.

(I) Alkylation of hydrocarbons, for example, the alkylation of aromatic compounds such as benzene, naphthalene, anthracene, phenols and chloroalkyl or nitro aromatics by contact with alcohols, olefins and alkyl chlorides. Such conversions may be effected in the presence of alumina, pumice or kieselguhr impregnated with aluminum chloride and fissionable material at temperatures in the range of 70 to 350° F. and moderate pressures. Fissionable material free core of particles of same composition as carrier material.

(J) Hydrocracking of petroleum hydrocarbons, particularly those boiling above gasoline. Such reactions are conducted in the presence of a microporous particle form material such as alumina impregnated with platinum and containing halogen and dispersed plutonium (core of each particle consists of alumina-beryllia mixture and is free of fissionable material) and in the presence of added hydrogen at temperatures in the range of 400 to 1,000° F. and pressures in the range of 50 to 1,500 p.s.i.g. and space velocities in the range of 0.05 to 40.

(K) Non-hydrogenative cracking of petroleum hydrocarbons, particularly those boiling above gasoline, over alumina or silica-alumina microporous materials impregnated with fissionable materials (core of particles silica, alumina or silica-alumina). Conversion conditions are temperatures in the range of 400 to 1,200° F., pressures in the range of atmospheric to 500 p.s.i.g and space velocities in the range of 0.05 to 40.

(L) Isomerization of paraffins and cycloparaffins over alumina or silica-alumina containing finely dispersed fissionable material on suitable fissionable-material-free core at temperatures in the range of 200 to 1,000° F., pressures in the range of atmospheric to 1,000 p.s.i.g. and space velocities in the range of 0.05 to 40.

(M) Partial oxidation reactions, for example, conversion of propane with controlled amounts of air or oxygen to alcohols, aldhydes, ketones and acids over microporous active charcoal which has been impregnated with copper oxide and tungsten oxide mixtures and with fissionable materials particles free of fissionable material in core portion at temperatures in the range of 50 to 800° F. and pressures in the range of 1 to 100 atmospheres. Another example is the conversion of liquid or gaseous hydrocarbons such as propane in the presence of water to synthesis gas (carbon monoxide and hydrogen) over such microporous contact materials as alumina or graphite impregnated with nickel and with fissionable material (particles with graphite core). Such conversions are conducted at temperatures in the range of 200 to 1,000° F. and pressures in the range of 5 to 1,000 p.s.i.g., with residence times in the contact mass in the range of 0.1 to 60 seconds.

(N) Dehydration reactions such as the dehydration of ethylalcohol over microporous alumina particles containing the uranium or other fissionable material (particles with alumina-carbon core, free of fissionable materials) at temperatures in the range of 200 to 600° F. and moderate pressures, with resultant formation of ethylene.

FURTHER EXAMPLE

In further illustration and example of the application of the method of this invention, reference may be made to the conversion of a hydrocarbon gas fraction consisting of a mixture containing 50% by volume methane, 20% ethane, 20% normal propane and 10% normal butane to hydrogen and generally lower molecular weight hydrocarbons. A reactor of the type shown in FIGURE 2 is employed. The reactor vessel has a cylindrical bed 204, measuring 30 centimeters in diameter, 200 centimeters long and 142,000 cubic centimeters in total volume. The bed contains the mass of contact material in the form of spherical, microporous particles comprised of a core portion composed of coprecipitated, mixed beryllia, alumina and impregnated with carbon, having a nominal diameter of about 4000 microns, and being substantially free of fissionable material, and a surrounding fissionable material-containing layer having a thickness of about 2000 microns and being composed of alumina and uranium oxide. The particles of contact material are prepared by the following procedure: ammonium hydroxide is added to a mixture of aluminum and beryllium nitrates in about equal molecular proportions to coprecipitate the mixed hydroxides of aluminum and beryllium. The resulting gelatinous precipitate is washed, filtered, mixed with suitable combustible binder and formed into pellets, dried and calcined at 930° F. in air. The beryllia-alumina pellets are then subjected at 2100° F. to a stream of methane-rich natural gas until pores of the particles have been filled with carbonaceous deposit. These particles are then cooled and soaked in aluminum nitrate solution, removed and heated in air at 575° F. to decompose the nitrate and at the same time time burning some of the carbon deposited near the outer surfaces of the particles. This leaves the outer surface roughened for better adherence of subsequent layers. The particles are soaked again in aluminum nitrate, dipped in $NH_4OH$ solutions to precipitate aluminum hydroxide and heated to 750° F. to form alumina. The process is repeated until a layer of alumina has been formed around the beryllia-alumina core which is of the desired thickness for the fissionable material containing layer, in this case 2000 microns. The latter layer of the pellets is then impregnated with $U^{235}$ enriched uranyl nitrate solution. The impregnated pellets are added to ammonium hydroxide solution to precipitate the uranium. The particles are then heated in a nitrogen stream at about 850–950° F. and finally in a rapid hydrogen stream until the dew point of this stream is about 35° F. The amount of uranium added to the particles is such that the uranium oxide content of the final particles provides uranium in amount of about 5 percent by weight of the particles. The uranium is about 50% enriched in $U^{235}$. The total weight of $U^{235}$ in the mass 204 is slightly in excess of 6000 grams.

The apparent bulk density of the contact material (unpacked) is about 105 pounds per cubic foot. The surface area of the fission layer of the contact material is about 300 square meters per gram, and the pore volume is about 35% of the total particle volume. The micropore volume is about 70% of the total pore volume.

If desired, an alumina jacket may be added to the particles subsequent to the step of heating the uranium impregnated particles by resuming the coating procedure outlined above. It will be noted that by this procedure, two or three layered particles can be made which have a continuous matrix (in this case alumina) extending through all of the layers. This renders the particle less susceptible to cracking and breakage as a result of temperature changes.

The reactant feed stream is preheated to 400° F. and passed through the contact mass at a rate of about 1152 grams of feed per minute. The pressure in the conversion zone is maintained at about 5 p.s.i.g. The mass 204 in the reactor 200 for this example is of such size that a self-sustaining, neutron-multiplying reaction can be effected therein. The neutron flux in the mass and the amount of fission reaction occurring is controlled by cadmium-containing rods 217 and 218 so that sufficient energy is released for effecting the chemical reaction, but overheating of the mass is avoided. The overall neutron flux in the mass is regulated or controlled at about $1 \times 10^{13}$ neutrons per square centimeter per second. Excess heat released by the fission reaction above that converted to chemical energy is removed by recycling unconverted raw feed material, including the heavier hydrocarbons formed to the reactor at 400° F. The products from the conversion will contain hydrogen and lesser amounts of ethane, propane and butane and other hydrocarbons including unconverted methane.

GENERAL OPERATING CONDITIONS

Operating conditions employed in the conversion zone in the method of this invention may vary over a broad range, depending upon the particular chemical conversion involved. In general, temperatures within the contact mass should be sufficiently high for progress of the chemical conversion at a practical rate and yet below a level which would cause serious heat damage to the porous contact material as a result of sintering, change in crystalline structure of one or more of its components or other reasons. The required conversion temperature and other conditions affecting reaction severity will be more moderate than is the case in the absence of the fission product radiation. Generally, the selected contact mass temperature will fall within the range of about −50 to 1,200° F., pressure within the range of subatmospheric to about 100 atmospheres and reactant residence time in the contact mass from about one-half second to about 50 hours, and preferably 1 second to 4 hours. The thermal neutron flux in the contact mass will fall within the range of about $10^{11}$ to $10^{14}$ square centimeters per second.

It should be understood that the specific examples of operating conditions and methods, apparatus arrangement and applications of the invention described herein are exemplary in character and are not to be construed as limiting the scope of the invention thereto unless so stated.

I claim:

1. A contact material particle comprising a solid core portion which is substantially free of fissionable material and a 30 to 25,000-micron thick, porous, solid portion containing dispersed fissionable material surrounding said core portion, said core portion having a nominal diameter in excess of about 50 microns and occupying about 20 to 90 percent of the volume of said particle and having a capture cross-section for thermal neutrons less than about 10 barns, said fissionable material-containing portion having a surface area within the range of about 5 to 1,500 square meters per gram and a pore volume within the range of about 5 to 70 percent, the pores in said fissionable material-containing portion having radii within the range of about 4 angstroms to 100 microns and said particle having an overall nominal diameter within the range of about 150 microns to one inch.

2. A contact material particle according to claim 1 further characterized in that the fissionable material in said particle is substantially in excess of 0.8 percent by weight of said particle.

3. As a composition of matter, a particle comprising a core portion having a nominal diameter in excess of about 50 microns and being substantially free of fissionable material, a solid, fissionable material-containing portion surrounding said core portion, and a porous, solid shell portion surrounding said fissionable material-containing portion, said shell portion being substantially free of fissionable material and having a thickness of at least 10 microns and having a surface area within the range of about 5 to 1,500 square meters per gram and having about 5 to 70 percent of its volume devoted to pores of a radius within the range of about 4 angstroms to about 100 microns, the overall nominal diameter of said particle being in the range of about 150 microns to about one inch.

4. A contact material mass for chemo-nuclear conversions in the form of a bed of discrete solid particles arranged in an enclosed chamber adapted to permit passage of reactant fluid through said bed to contact said particles, said solid particles having nominal diameters within the range of about 150 microns to about one inch, each of said particles comprising a core portion composed of inorganic, solid material having a capture cross-section for thermal neutrons less than about 10 barns and being substantially free of fissionable material, and a solid, fissionable material-containing portion surrounding said core portion, the core portion having a nominal diameter in excess of about 50 microns and having a volume within the range of 20 to 90 percent of that of a particle, and the relative volumes of said core portion and said fissionable material-containing portion and the concentration of fissionable material in said latter portion being correlated to provide in excess of 0.8 percent by weight fissionable material in said particles, and to render said mass capable of effecting a neutron-multiplying reaction when a suitably controlled and moderated neutron flux is maintained therein.

5. A mass of contact material in accordance with claim 4 further characterized in that the fissionable material-containing portion of each of said particles is sized and shaped to initially retain in the particles substantially all of the normally solid fission fragments released by fission of the fissionable material and in that said fissionable material-containing portion is microporous, having a surface area within the range of 5 to 1,500 square meters per gram and a pore volume within the range of 5 to 70 percent.

6. A contact material mass in accordance with claim 4 further characterized in that said fissionable material-containing portion is microporous, having a surface area within the range of 5 to 1,500 square meters per gram and a pore volume within the range of 5 to 70 percent, and in that said fissionable material-containing portion is surrounded by an outer shell portion of porous, inorganic, solid material having a thickness within the range of 10 to 100 microns, adapted to substantially prevent initial escape of normally solid fragments of fission therethrough to the exterior surface, said shell being substantially free of fissionable material.

7. A contact material particle for conduct of chemo-nuclear conversions comprised of: a solid core portion having a nominal diameter in excess of about 50 microns, which is substantially free of fissionable material, and is composed of material having a capture cross-section for thermal neutrons less than about 0.2 barn and an outer portion containing fissionable material surrounding said core portion, at least said outer portion being composed of microporous, solid material having a surface area within the range of about 5 to 1,500 square meters per gram and a pore volume within the range of about 5 to 70 percent, the fissionable material in said outer portion being dispersed in less than 6-micron grain size substantially uniformly throughout at least portions of said outer portion, including at least some portions adjacent the external surfaces of said particle, and the average weighted volume distance from within all fissionable material-containing portions of said outer portion to the nearest external surface thereof being greater than about 100 microns, whereby substantially all of the normally solid fragments of fission released by nuclear fission of said fissionable material are initially retained in said particle.

8. A contact material particle in accordance with claim 7 further characterized in that said core portion is composed of a microporous, inorganic, solid material, said core portion having a volume between 30 and 50 percent of the total pore volume, and the nominal diameter of said particle being within the range of about 600 microns to about one-half inch, and the amount of fissionable material in said particle being in excess of about one percent by weight of the particle.

9. A contact material particle for chemo-nuclear conversions comprising: a core portion having a nominal diameter in excess of about 50 microns and composed of inorganic, solid material which is substantially free of fissionable material and is a good moderator for neutrons, an intermediate fissionable material-containing portion surrounding said core portion, composed of microporous, inorganic, solid carrier material having fissionable material dispersed therein in less than about 6-micron grain size and an outer shell portion composed of porous, inorganic, solid material substantially free of fissionable material, said core portion having a capture cross-section for thermal neutrons less than about 0.2 barn, said microporous material in said intermediate portion having a surface area within the range of about 5 to 1,500 square meters per gram and a pore volume within the range of about 5 to 70 percent, the pores in said microporous material having radii within the range of about 4 angstroms to 100 microns, the fissionable material dispersed in said microporous material being in excess of 0.8 percent by weight of said particle and said shell portion having a thickness within the range of about 10 to 100 microns, adapted to substantially prevent initial escape of normally solid fragments released by fission of said fissionable material.

10. A method for utilizing energy of nuclear fission in the conduct of chemical conversions of fluid reactants to products of different composition, which method comprises: bringing fluid reactant feed material into contact with a mass of contact material made up of discrete, solid particles having nominal diameters within the range of about 150 microns to about one inch; each particle comprising a core portion having a nominal diameter in excess of about 50 microns, being composed of solid, inorganic material having a capture cross-section for thermal neutrons less than about 10 barns and being substantially free of fissionable material, an intermediate portion composed of solid, inorganic material containing fissionable material surrounding said core portion and a shell portion composed of porous, solid, inorganic material surrounding said intermediate portion, said shell portion being substantially free of fissionable material and being of sufficient thickness to prevent substantial initial escape of normally solid fission fragments to the exterior surface thereof; the concentration of fissionable material in said particles being sufficient to render said mass in said zone, under the conversion conditions therein, capable of effecting a neutron-multiplying fission reaction when a suitably controlled neutron flux is maintained therein; maintaining a neutron flux within said mass and suitably controlling said flux and moderating the neutrons to promote neutron-multiplying fission of said fissionable material at a rate sufficient to supply the energy required for effecting the chemical conversion of said fluid reactants to desired products and separating fluid products of said conversion from said contact material.

11. A method for utilizing the energy of the fission fragments from nuclear fission of fissionable material for the conduct of chemical conversions of fluid reactants to fluid products of different composition, which conversions require supply of substantial amounts of energy, which method comprises: contacting fluid reactant feed material in a confined zone with a mass of contact material made up of discrete, solid particles having nominal diameters within the range of about 150 microns to about one inch; each particle comprising, an inner core portion having a nominal diameter in excess of about 50 microns, which core portion is substantially free of fissionable material and is composed of material having a capture cross-section for thermal neutrons less than about 10 barns, an intermediate portion surrounding said core portion which is composed of solid carrier material containing fissionable material dispersed in less than 6-micron grain size, an outer shell portion surrounding said intermediate portion which is composed of microporous, solid material substantially free of fissionable material, said shell portion having a thickness within the range of about 10 to 100 microns, adapted to prevent substantial initial escape of normally solid products of fission to the exterior surface thereof and said shell portion having a surface area within the range of about 5 to 1,500 square meters per gram and a pore volume within the range of 5 to 70 percent; the concentration of fissionable material in said intermediate portion and the size of said intermediate portion relative to said core portion being correlated to provide an amount of fissionable material sufficient to render said mass in its environment in said zone under the chemical conversion conditions, including suitable neutron moderation, capable of effecting a neutron-multiplying fission reaction, in the presence of suitable neutron flux; maintaining a neutron flux in said mass and moderating the neutrons in said mass whereby neutron-multplying fission of said fissionable material occurs, with resultant release of heavy fission fragments of high kinetic energy within said particles, whereby chemical conversion of said reactant feed is effected with concurrent transformation of some of the kinetic energy of said heavy fission fragments to chemical energy; controlling said neutron flux to promote at least sufficient fission reaction to supply the energy required for effecting the desired chemical conversion of said fluid reactant feed to the desired products; controlling the temperature in said zone at a level suitable for said chemical conversion but below that which would cause serious heat damage to said particles and separating fluid conversion products from said mass.

12. A method according to claim 11 further characterized in that the intermediate portion of each of said particles of contact material is composed of microporous carrier material containing dispersed fissionable material and having a surface area within the range of about 5 to 1,500 square meters per gram and a pore volume within the range of about 5 to 70 percent and said shell portion having greater than 50 percent of the pores therein with radii in excess of about 100 angstroms.

13. A method for utilizing the energy of the fission fragments from nuclear fission of fissionable material for the conduct of chemical conversions of fluid reactants to fluid products of different composition, which conversions require supply of substantial amounts of energy, which method comprises: contacting fluid reactant feed material in a confined zone with a mass of contact material made up of discrete, solid particles having nominal diameters within the range of about 150 microns to about one inch; each particle comprising, an inner core portion substantially free of fissionable material and a fissionable material-containing portion surrounding said core portion, said core portion having a nominal diameter in excess of 50 microns and being composed of inorganic, solid material having a capture cross-section for thermal neutrons less than about 10 barns, said fissionable material-containing portion being composed of microporous, solid material containing fissionable material dispersed in less than 6-micron grain size and having a surface area within the range of about 5 to 1,500 square meters per gram and a pore volume within the range of 5 to 70 percent; the concentration of fissionable material in said particles being sufficient to render said mass in said zone, under the conversion conditions therein, capable of effecting a neutron-multiplying fission reaction when a suitably controlled neutron flux is maintained therein; maintaining a neutron flux within said mass and suitably controlling said flux to promote neutron-multiplying fission of said fissionable material at a rate sufficient to supply the energy required for effecting the chemical conversion of said fluid reactant to desired products and separating fluid products of said conversion from said contact material.

14. The method of claim 13 further characterized in that the average weighted volume distance from all fissionable material-containing portions of said particles to the nearest exposed surface of said particles is equal to at least about 100 microns, whereby substantially all of the normally solid fragments released by fission of said fissionable material are initially retained within said particles.

15. The method of claim 14 further characterized in that the concentration of said fissionable material in the fissionable material-containing portion of said particles of contact material is sufficient to render said mass capable of effecting a self-sustaining, neutron-multiplying fission reaction in said confined zone, and the said neutron flux in said zone is controlled at least in part by control of the amount of material in said zone having a high capture cross-section for thermal neutrons.

16. The method of claim 14 further characterized in that the core portion and fissionable material-containing portion of said particles are composed of essentially the same microporous material except for the absence of fissionable material in said core portion, said microporous material having a surface area within the range of about 5 to 1,500 square meters per gram and pore volume within the range of about 5 to 70 percent of the total volume.

17. The method of claim 14 further characterized in that said mass of contact material in said confined zone is incapable of effecting a self-sustaining, neutron-multiplying reaction of critical intensity, and the neutron flux in said mass is controlled by irradiating the mass with neutrons from an outside source.

18. The method of claim 14 further characterized in that said mass of contact material comprises a portion of the fuel mass in an atomic reactor which is capable of effecting a self-sustaining, neutron-multiplying fission reaction, said contact material mass being confined out of fluid communication with the remainder of the fuel mass but being in gamma and neutron radiation communication therewith.

19. A method for utilizing the energy of the fission fragments from nuclear fission of fissionable material for the conduct of chemical conversions of fluid reactants to fluid products of different composition, which conversions required supply of substantal amounts of energy, which method comprises: contacting fluid reactant feed material in a confined zone with a mass of contact material made up of discrete, solid particles having nominal diameters within the range of about 150 microns to about one inch; each particle comprising, a core portion having a nominal diameter in excess of about 50 microns, said core portion being free of fissionable material and being composed of an inorganic, solid material which is a good moderator material for neutrons and has a capture cross-section for thermal neutrons less than about 0.2 barn, a carrier layer of microporous, solid, inorganic materal encasing said core portion, said carrier layer having a surface area within the range of about 5 to 1,500 square meters per gram and a pore volume within the range of about 5 to 70 percent and containing fissionable material dispersed in grain size less than about 6 microns, the average weighted volume distance from all portions of said carrier layer containing fissionable material to the nearest exposed surface of said layer being in excess of about 100 microns, whereby substantially all of the normally solid fission fragments released by fission of said fissionable material are initially retained within said particles, the relative size of said core portion and the carrier layer and the concentration of fissionable material in the carrier layer of said particles being correlated to render said mass in its environment in said zone under the chemical conversion conditions, including suitable neutron moderation, capable of effecting a neutron-multiplying fission reaction, in the presence of suitable neutron flux, maintaining a neutron flux in said mass and moderating the neutrons in said mass to promote neutron-multiplying fission of said fissionable material, with resultant release of heavy fission fragments of high kinetic energy within said particles, whereby chemical conversion of said reactant feed is effected with concurrent transformation of some of the kinetic energy of said heavy fragments to chemical energy; controlling said neutron flux to promote at least sufficient fission reaction to supply the energy required for effecting the desired chemical conversion of said fluid reactant feed to the desired products; controlling the temperature in said zone at a level suitable for said chemical conversion and below a level at which the contact material would suffer excessive heat damage and separating fluid conversion products from said mass.

References Cited by the Examiner

UNITED STATES PATENTS

| | | | |
|---|---|---|---|
| 2,856,336 | 10/1958 | Metcalf | 176—33 |
| 2,864,758 | 12/1958 | Shockelford | 176—83 |
| 2,872,396 | 2/1959 | Wilson et al. | 204—162 |
| 2,892,765 | 6/1959 | Young | 176—33 |
| 2,904,484 | 9/1959 | Houston et al. | 204—154 |
| 2,905,606 | 9/1959 | Long et al. | 204—154 |
| 2,905,610 | 9/1959 | Wigner | 204—193 |
| 2,958,637 | 11/1960 | Voorhees | 176—39 |

(Other references on following page)

| | | |
|---|---|---|
| 2,967,811 | 1/1961 | Flint. |
| 3,065,159 | 11/1962 | Conner et al. _____ 204—154 X |
| 3,085,057 | 4/1963 | Ogorzaly _____ 176—39 |

FOREIGN PATENTS

| | | |
|---|---|---|
| 583,465 | 9/1959 | Canada. |
| 792,114 | 3/1958 | Great Britain. |
| 821,297 | 10/1959 | Great Britain. |

OTHER REFERENCES

Proceedings of the Second International Conference on the Peaceful Uses of Atomic Energy, Paper 76, vol. 8, pp. 252–262.

REUBEN EPSTEIN, *Primary Examiner.*

CARL D. QUARFORTH, LEON D. ROSDOL, ROGER L. CAMPBELL, *Examiners.*